United States Patent
Ho et al.

(10) Patent No.: US 7,752,111 B2
(45) Date of Patent: Jul. 6, 2010

(54) EXPOSURE BASED ON CAPACITY

(75) Inventors: Winson Ho, New York, NY (US); Viktor Zurakhinsky, Ossining, NY (US)

(73) Assignee: RBC Capital Markets Corporation, New York, NY (US)

( * ) Notice: Subject to any disclaimer, the term of this patent is extended or adjusted under 35 U.S.C. 154(b) by 507 days.

(21) Appl. No.: 11/345,022

(22) Filed: Jan. 31, 2006

(65) Prior Publication Data

US 2007/0005472 A1 Jan. 4, 2007

Related U.S. Application Data

(60) Provisional application No. 60/696,499, filed on Jul. 1, 2005.

(51) Int. Cl.
*G06Q 40/00* (2006.01)
(52) U.S. Cl. .................. 705/36 R; 705/37; 705/38
(58) Field of Classification Search .................. 705/35, 705/36 R, 37, 38
See application file for complete search history.

(56) References Cited

U.S. PATENT DOCUMENTS

| | | | |
|---|---|---|---|
| 5,806,048 A | 9/1998 | Kiron et al. | |
| 5,819,238 A | 10/1998 | Fernholz | |
| 6,061,663 A | 5/2000 | Bloom et al. | |
| 6,524,109 B1 | 2/2003 | Lacy et al. | 434/219 |
| 6,856,971 B1 | 2/2005 | Sperandeo | 705/36 |
| 6,928,418 B2 | 8/2005 | Michaud et al. | 705/36 |
| 7,062,459 B1 | 6/2006 | Herbst et al. | 705/37 |
| 7,085,738 B2 | 8/2006 | Tarrant | 705/36 |
| 7,366,692 B2 | 4/2008 | Alcaly et al. | 705/37 |
| 2003/0172026 A1* | 9/2003 | Tarrant | 705/39 |
| 2003/0195824 A1 | 10/2003 | Duffy et al. | 705/26 |
| 2005/0171882 A1 | 8/2005 | Nevins | 705/36 |
| 2006/0080250 A1 | 4/2006 | Hansen et al. | 705/42 |

OTHER PUBLICATIONS

The Trouble With Hedge Fund IndexesReturns are skewed due to survivor bias, backfill bias and style drift Josh Friedlander (josh.friedlander@thomsonmedia.com). The Investment Dealers' Digest : IDD. New York: Feb 7, 2005. p. 1.*
Managing the Russell Recon: A Decade of Change for Traders Nina Mehta. Traders Magazine. New York: Jun 1, 2005. p. 1.*
S.& P. Tries a Hedge-Fund Gauge Donna Rosato. New York Times. (Late Edition (East Coast)). New York, N. Y.: Jun 2, 2002. p. 3.7.*
Alternative investments: Managed futures as a portfolio driver Greg Horn. Trusts & Estates. New York: Nov 1998. vol. 137, Iss. 12; p. 12 (3 pages).*
CSFB / Tremont Hedge Fund Index, "Index Rules", Apr. 1, 2005, 18 pages.
Standard & Poor's Hedge Fund Index, "Structure, Methodology, Definitions, and Practices", Jan. 23, 2003, 41 pages.
CSFB / Tremont Hedge Fund Index, Index Construction Rules, Mar. 4, 2002.

* cited by examiner

*Primary Examiner*—Lalita M Hamilton
(74) *Attorney, Agent, or Firm*—Fish & Richardson P.C.

(57) ABSTRACT

This invention relates to hedge fund indexing in general and methods and systems for constructing and maintaining investable hedge fund indices in particular.

16 Claims, 17 Drawing Sheets

EXPOSURE BASED ON CAPACITY

This application claims priority under 35 U.S.C. §119 to U.S. Provisional Patent Application Ser. No. 60/696,499, filed Jul. 1, 2005, and entitled "INDEX REBALANCING", the entire contents of which are hereby incorporated by reference.

BACKGROUND

Hedge funds have recently become increasingly popular due to their potential for generating positive returns in various market environments. Given complexities and operational difficulties in investing in unregulated products, such as hedge funds, this development led to an increase in popularity of hedge fund indices.

In general, hedge fund indices provide performance benchmarks based on a large and representative sample of hedge funds. For example, hedge fund indices focus on capturing the average return and risk characteristics of hedge funds viewed as an asset class, rather than attempting to outperform the asset class by choosing better performing hedge funds for the index.

The index is published on a predetermined (e.g., monthly) basis and represent the weighted average performance of hedge funds included in the hedge fund index. The performance can be calculated and published for the overall index, as well as for various subsets of the overall index as defined, for example, by an investment strategy, geographical location, assets under management, etc.

The task of determining the composition of the index (i.e., hedge funds included in the index), the weights assigned to each fund and performance of the index is usually performed by a person or an entity called index Administrator. In determining index composition, fund weights and performance, the index Administrator typically uses a set of publicly disclosed principles, and/or formalized rules.

SUMMARY

This invention relates to hedge fund indexing in general and methods and systems for constructing and maintaining investable hedge fund indices in particular.

According to an aspect of the present invention, a method includes providing structured products that provide a rate of return related to changes in a value of a hedge fund index that includes of a plurality of hedge funds. The method also includes adjusting weights of the plurality of hedge funds in the hedge fund index according to a set of rules based on changes in monetary exposure of the structured products associated with the index.

Embodiments can include one or more of the following. The monetary exposure can be related to a cash flow into the structured products associated with the index and issue of new structured products. The monetary exposure can be related to a cash flow out of the structured products associated with the index and termination of the outstanding structured products. A set of funds included in the set of investments associated with the structured products can be different from the plurality of hedge funds in the hedge fund index. The weights of funds included in the set of investments associated with the structured products can be different from the weights these funds in the hedge fund index. The structured products can include one or more of options, swaps, principle protected notes, puts, and forwards.

Adjusting the weights can include adjusting the weights based on an estimate of the maximum amounts that can be redeemed from the hedge funds. Adjusting the weights can include adjusting the weights based on an estimate of the dates at which the redemptions are allowed. Adjusting the weights can include adjusting the weights based on an estimate of the redemption notice periods prescribed by the hedge fund. Adjusting the weights can include adjusting the weights based on an estimate of the redemption rules prescribed by the hedge fund. Adjusting the weights can include adjusting the weights based on an estimate of the maximum amounts that can be invested in the hedge funds in the future. Adjusting the weights can include adjusting the weights based on an estimate of the maximum amounts that can be invested in the hedge funds in the future and maximum amounts that can be invested on each particular date in the future.

In another aspect, the invention includes a computer program product tangibly embodied in an information carrier, for executing instructions on a processor. The computer program product is operable to cause a machine to adjust weights of a plurality of hedge funds in a hedge fund index according to a set of rules based on changes in monetary exposure of structured products associated with the index, the structured products providing a rate of return related to changes in a value of the hedge fund index.

Embodiments can include one or more of the following. The monetary exposure can be related to a cash flow into the structured products associated with the index and issue of new structured products. The monetary exposure can be related to a cash flow out of the structured products associated with the index and termination of the outstanding structured products. A set of funds included in the set of investments associated with the structured products may be different from the plurality of hedge funds in the hedge fund index and the weights of funds included in the set of investments associated with the structured products may be different from the weights these funds in the hedge fund index. The structured products can include one or more of options, swaps, principle protected notes, puts, and forwards.

In another aspect, the invention includes a system that includes a processor. The processor is configured to adjust weights of a plurality of hedge funds in a hedge fund index according to a set of rules based on changes in monetary exposure of structured products associated with the index, the structured products providing a rate of return related to changes in a value of the hedge fund index.

Embodiments can include one or more of the following. The monetary exposure can be related to a cash flow into the structured products associated with the index and issue of new structured products. The monetary exposure can be related to a cash flow out of the structured products associated with the index and termination of the outstanding structured products. A set of funds included in the set of investments associated with the structured products may be different from the plurality of hedge funds in the hedge fund index and the weights of funds included in the set of investments associated with the structured products may be different from the weights these funds in the hedge fund index. The structured products can include one or more of options, swaps, principle protected notes, puts, and forwards.

According to an aspect of the present invention, a method includes providing an index representing a plurality of hedge funds, each of the plurality of hedge funds having an associated weight. The method also includes determining a capacity limit for a particular one of the plurality of hedge funds based on a maximum amount that can be invested in the hedge fund and adjusting an associated weight in the index for the particular one of the plurality of hedge funds based on the determined capacity limit.

Embodiments can include one or more of the following. The maximum amount that can be allocated to the hedge fund according the set of predetermined rules can be based on the maximum amount that the hedge fund is willing to accept. The maximum amount that can be allocated to the hedge fund according the set of predetermined rules can be based on the maximum amount that the index provider can invest in the hedge fund based on risk management limitations of the index provider. The maximum amount that can be invested in the hedge fund according the set of predetermined rules can be based on the maximum amount that the index provider can allocate to the hedge fund based on regulatory limitations, contractual limitations or fiduciary responsibilities.

According to an aspect of the present invention, a method includes providing an index representing a plurality of hedge funds, each of the plurality of hedge funds having an associated weight. The method also includes estimating a capacity limit for a particular one of the plurality of hedge funds based on a maximum amount that can be redeemed from the hedge fund and adjusting the weight for a particular one of the hedge funds based on the estimate of the maximum amount that can be redeemed from the hedge fund.

Embodiments can include one or more of the following. Adjusting the associated weight for the particular one of the plurality of hedge funds further can include adjusting the weight based on an estimate of the date at which a redemption is allowed. Adjusting the associated weight for the particular one of the plurality of hedge funds further can include adjusting the weight based on an estimate of the redemption notice period prescribed by the hedge fund.

In another aspect, the invention includes a computer program product tangibly embodied in an information carrier, for executing instructions on a processor. The computer program product is operable to cause a machine to provide an index representing a plurality of hedge funds, each of the plurality of hedge funds having an associated weight. The computer program product is also operable to cause a machine to determine a capacity limit for a particular one of the plurality of hedge funds based on a maximum amount that can be invested in the hedge fund and adjust an associated weight in the index for the particular one of the plurality of hedge funds based on the determined capacity limit.

Embodiments can include one or more of the following. The maximum amount that can be allocated to the hedge fund according the set of predetermined rules can be based on the maximum amount that the hedge fund is willing to accept. The maximum amount that can be allocated to the hedge fund according the set of predetermined rules can be based on the maximum amount that the index provider can invest in the hedge fund based on risk management limitations of the index provider. The maximum amount that can be invested in the hedge fund according the set of predetermined rules can be based on the maximum amount that the index provider can allocate to the hedge fund based on regulatory limitations, contractual limitations or fiduciary responsibilities.

In another aspect, the invention includes a computer program product tangibly embodied in an information carrier, for executing instructions on a processor. The computer program product is operable to cause a machine to provide an index representing a plurality of hedge funds, each of the plurality of hedge funds having an associated weigh, estimate a capacity limit for a particular one of the plurality of hedge funds based on a maximum amount that can be redeemed from the hedge fund, and adjust the weight for a particular one of the hedge funds based on the estimate of the maximum amount that can be redeemed from the hedge fund.

Embodiments can include one or more of the following. The instructions to cause the machine to adjust the associated weight for the particular one of the plurality of hedge funds can includes instructions to cause the machine to adjust the weight based on an estimate of the date at which a redemption is allowed. The instructions to cause the machine to adjust the associated weight for the particular one of the plurality of hedge funds can include instructions to cause the machine to adjust the weight based on an estimate of the redemption notice period prescribed by the hedge fund.

In another aspect, the invention includes a system configured to provide an index representing a plurality of hedge funds, each of the plurality of hedge funds having an associated weight, determine a capacity limit for a particular one of the plurality of hedge funds based on a maximum amount that can be invested in the hedge fund, and adjust an associated weight in the index for the particular one of the plurality of hedge funds based on the determined capacity limit.

Embodiments can include one or more of the following. The maximum amount that can be allocated to the hedge fund according the set of predetermined rules can be based on the maximum amount that the hedge fund is willing to accept. The maximum amount that can be allocated to the hedge fund according the set of predetermined rules can be based on the maximum amount that the index provider can invest in the hedge fund based on risk management limitations of the index provider. The maximum amount that can be invested in the hedge fund according the set of predetermined rules can be based on the maximum amount that the index provider can allocate to the hedge fund based on regulatory limitations, contractual limitations or fiduciary responsibilities.

In another aspect, the invention includes a system configured to provide an index representing a plurality of hedge funds, each of the plurality of hedge funds having an associated weight, estimate a capacity limit for a particular one of the plurality of hedge funds based on a maximum amount that can be redeemed from the hedge fund, and adjust the weight for a particular one of the hedge funds based on the estimate of the maximum amount that can be redeemed from the hedge fund.

Embodiments can include one or more of the following. The system can be further configured to adjust the weight based on an estimate of the date at which a redemption is allowed. The system can be further configured to adjust the weight based on an estimate of the redemption notice period prescribed by the hedge fund.

According to an aspect of the present invention, a method includes determining weights of a plurality of hedge funds in a hedge fund index according to a set of rules, wherein the weights differ from a set of weights of the hedge funds in an actual investment associated with the hedge fund index.

Embodiments can include one or more of the following. The method can also include providing a return for the hedge fund index, wherein the return of the index and a return of the actual investment differ. The weight can be non-negative. Determining the weights of the plurality of hedge funds in the hedge fund index can include adjusting the weights of the hedge funds according to changes in a notional amount associated with the hedge fund index. The changes in the notional amount can be based on changes to a monetary exposure to products associated with the hedge fund index. The products can be structured products.

In another aspect, the invention includes a computer program product tangibly embodied in an information carrier, for executing instructions on a processor. The computer program product is operable to cause a machine to determine weights of a plurality of hedge funds in a hedge fund index according to a set of rules, wherein the weights differ from a set of weights of the hedge funds in an actual investment associated with the hedge fund index.

Embodiments can include one or more of the following. The computer program product can further include instructions to cause the machine to provide a return for the hedge fund index, wherein the return of the index and a return of the actual investment differ. The weight can be non-negative. The instructions to cause the machine to determine the weights of the plurality of hedge funds in the hedge fund index further can include instructions to cause the machine to adjust the weights of the hedge funds according to changes in a notional amount associated with the hedge fund index. The changes in the notional amount can be based on changes to a monetary exposure to products associated with the hedge fund index. The products can be structured products.

In another aspect, the invention includes a system configured to determine weights of a plurality of hedge funds in a hedge fund index according to a set of rules, wherein the weights differ from a set of weights of the hedge funds in an actual investment associated with the hedge fund index.

Embodiments can include one or more of the following. The system can be further configured to provide a return for the hedge fund index, wherein the return of the index and a return of the actual investment differ. The weight can be non-negative. The system can be further configured to adjust the weights of the hedge funds according to changes in a notional amount associated with the hedge fund index. The changes in the notional amount can be based on changes to a monetary exposure to products associated with the hedge fund index. The products can be structured products.

According to an aspect of the present invention, a method includes calculating a projected hedge fund weight for a hedge fund included in a hedge fund index, determining an estimated weight adjustment for the hedge fund, determining an adjustment factor based on an estimation of error in the estimated weight adjustment, and determining an actual weight adjustment for the hedge fund based on the estimated weight adjustment and the adjustment factor.

Embodiments can include one or more of the following. Calculating the projected hedge fund weight can include calculating the projected hedge fund weight based on anticipated changes to a notional amount of the hedge fund index. Calculating the projected hedge fund weight can include calculating the projected hedge fund weight based on outstanding weight adjustments expected to take effect in the future. The actual weight adjustment can differ from the estimated weight adjustment.

In another aspect, the invention includes a computer program product tangibly embodied in an information carrier, for executing instructions on a processor. The computer program product is operable to cause a machine to calculate a projected hedge fund weight for a hedge fund included in a hedge fund index, determine an estimated weight adjustment for the hedge fund, determine an adjustment factor based on an estimation of error in the estimated weight adjustment, and determine an actual weight adjustment for the hedge fund based on the estimated weight adjustment and the adjustment factor.

Embodiments can include one or more of the following. The instructions to cause the machine to calculate the projected hedge fund weight can include instructions to cause the machine to calculate the projected hedge fund weight based on anticipated changes to a notional amount of the hedge fund index. The instructions to cause the machine to calculate the projected hedge fund weight can include instructions to cause the machine to calculate the projected hedge fund weight based on outstanding weight adjustments expected to take effect in the future. The actual weight adjustment can differ from the estimated weight adjustment.

In another aspect, the invention includes a system configured to calculate a projected hedge fund weight for a hedge fund included in a hedge fund index, determine an estimated weight adjustment for the hedge fund, determine an adjustment factor based on an estimation of error in the estimated weight adjustment, and determine an actual weight adjustment for the hedge fund based on the estimated weight adjustment and the adjustment factor.

Embodiments can include one or more of the following. The system can be further configured to calculate the projected hedge fund weight based on anticipated changes to a notional amount of the hedge fund index. The system can be further configured to calculate the projected hedge fund weight include instructions to cause the machine to calculate the projected hedge fund weight based on outstanding weight adjustments expected to take effect in the future. The actual weight adjustment can differ from the estimated weight adjustment.

According to an aspect of the present invention, a method includes determining, based on a set of target hedge fund weights and a set of estimated hedge fund weights, at least one of a subset of hedge funds in the index that are over-weighted and a subset of hedge funds in the index that are under-weighted. The method also includes adjusting weights of the index by increasing the weights of at least some of the under-weighted hedge funds based on an increase in monetary exposure of a set of products associated with the hedge fund index if there exists an increase in monetary exposure or decreasing the weights of at least some of the over-weighted hedge funds based on a decrease in monetary exposure of the set of products associated with the hedge fund index if there exists an decrease in monetary exposure.

Embodiments can include one or more of the following. The over-weighted hedge funds can include hedge funds with an estimated hedge fund weight that is greater than the target hedge fund weight. The under-weighted hedge funds can include hedge funds with an estimated hedge fund weight that is less than the target hedge fund weight. The change in monetary exposure can be related to a cash flow into or out of the structured products associated with the index. Increasing the weights can include increasing the weights of a plurality of under-weighted hedge funds based on an amount that the fund is under-weighted. Decreasing the weights can include decreasing the weights of a plurality of over-weighted hedge funds based on an amount that the fund is over-weighted.

In another aspect, the invention includes a computer program product tangibly embodied in an information carrier, for executing instructions on a processor. The computer program product is operable to cause a machine to determine, based on a set of target hedge fund weights and a set of estimated hedge fund weights, at least one of subset of hedge funds in the index that are over-weighted and a subset of hedge funds in the index that are under-weighted. The computer program product is also operable to cause a machine to adjust weights of the index. The instructions for causing the machine to adjust the weights of the index include instructions for causing the machine to increase the weights of at least some of the under-weighted hedge funds based on an increase in monetary exposure of a set of products associated with the hedge fund index if there exists an increase in monetary exposure or decrease the weights of at least some of the over-weighted hedge funds based on a decrease in monetary exposure of the set of products associated with the hedge fund index if there exists an decrease in monetary exposure.

Embodiments can include one or more of the following. The over-weighted hedge funds can include hedge funds with an estimated hedge fund weight that is greater than the target hedge fund weight. The under-weighted hedge funds can include hedge funds with an estimated hedge fund weight that is less than the target hedge fund weight. The change in monetary exposure can be related to a cash flow into or out of the structured products associated with the index. The instructions to cause the machine to increase the weights can include the instructions to cause the machine to increase the weights of a plurality of under-weighted hedge funds based on an amount that the fund is under-weighted. The instructions to cause the machine to decrease the weights can include the instructions to cause the machine to decrease the weights of a plurality of over-weighted hedge funds based on an amount that the fund is over-weighted.

In another aspect, the invention includes a system configured to determine, based on a set of target hedge fund weights and a set of estimated hedge fund weights, at least one of a subset of hedge funds in the index that are over-weighted and a subset of hedge funds in the index that are under-weighted. The system is further configured to adjust weights of the index by increasing the weights of at least some of the under-weighted hedge funds based on an increase in monetary exposure of a set of products associated with the hedge fund index if there exists an increase in monetary exposure or decreasing the weights of at least some of the over-weighted hedge funds based on a decrease in monetary exposure of the set of products associated with the hedge fund index if there exists an decrease in monetary exposure.

Embodiments can include one or more of the following. The over-weighted hedge funds can include hedge funds with an estimated hedge fund weight that is greater than the target hedge fund weight. The under-weighted hedge funds can include hedge funds with an estimated hedge fund weight that is less than the target hedge fund weight. The change in monetary exposure can be related to a cash flow into or out of the structured products associated with the index. The system can be configured to increase the weights of a plurality of under-weighted hedge funds based on an amount that the fund is under-weighted. The system can be configured to decrease the weights include the instructions to cause the machine to decrease the weights of a plurality of over-weighted hedge funds based on an amount that the fund is over-weighted.

According to an aspect of the present invention, a method includes grouping hedge funds in a hedge fund index into a plurality of strategy groups, the strategy groups comprised of hedge funds possessing similar trading strategies and associating a target strategy weight to each of the strategy groups, with the target strategy weight for a particular strategy group determined according to a percentage of existing hedge funds that exhibit similar hedging strategies as the strategy group.

Embodiments can include one or more of the following. The percentage of hedge funds can correspond to a moving average of the percentage of existing hedge funds that exhibit similar hedging strategies as the strategy group. The method can also include determining a maximum strategy weight for each of the strategy groups, calculating a total strategy weight for each of the strategy groups in the index, and if the calculated total strategy weight for a particular strategy group in the index exceeds the maximum strategy weight, re-adjusting the hedge funds included in the index. The maximum strategy weight can be approximately 120% of the target strategy weight. Providing the strategy groups and associating the target strategy weight to each of the strategy groups can include providing a target weight percentage for each strategy group. The method can also include determining a target fund number for each of the strategy groups based on the target strategy weight and the total number of funds included in the index. The strategy groups can include at least one of a convertible arbitrage strategy group, a fixed income arbitrage strategy group, an equity market neutral strategy group, an equity long/short strategy group, a macro strategy group, a managed futures strategy group, a merger/special strategy group, a credit strategy group, and a multi-strategy strategy group.

In another aspect, the invention includes a computer program product tangibly embodied in an information carrier, for executing instructions on a processor. The computer program product is operable to cause a machine to group hedge funds in a hedge fund index into a plurality of strategy groups, the strategy groups comprised of hedge funds possessing similar trading strategies and associate a target strategy weight to each of the strategy groups, with the target strategy weight for a particular strategy group determined according to a percentage of existing hedge funds that exhibit similar hedging strategies as the strategy group.

Embodiments can include one or more of the following. The percentage of hedge funds can correspond to a moving average of the percentage of existing hedge funds that exhibit similar hedging strategies as the strategy group. The computer program product can further include instructions to cause a machine to determine a maximum strategy weight for each of the strategy groups, calculate a total strategy weight for each of the strategy groups in the index, and if the calculated total strategy weight for a particular strategy group in the index exceeds the maximum strategy weight, re-adjust the hedge funds included in the index. The instructions to cause a machine to provide the strategy groups and associate the target strategy weight to each of the strategy groups can include instructions to cause a machine to provide a target weight percentage for each strategy group. The computer program product can also include instructions to cause a machine to determine a target fund number for each of the strategy groups based on the target strategy weight and the total number of funds included in the index. The strategy groups can include at least one of a convertible arbitrage strategy group, a fixed income arbitrage strategy group, an equity market neutral strategy group, an equity long/short strategy group, a macro strategy group, a managed futures strategy group, a merger/special strategy group, a credit strategy group, and a multi-strategy strategy group.

In another aspect, the invention includes a system configured to group hedge funds in a hedge fund index into a plurality of strategy groups, the strategy groups comprised of hedge funds possessing similar trading strategies and associate a target strategy weight to each of the strategy groups, with the target strategy weight for a particular strategy group determined according to a percentage of existing hedge funds that exhibit similar hedging strategies as the strategy group.

Embodiments can include one or more of the following. The percentage of hedge funds can correspond to a moving average of the percentage of existing hedge funds that exhibit similar hedging strategies as the strategy group. The system can be further configured to determine a maximum strategy weight for each of the strategy groups, calculate a total strategy weight for each of the strategy groups in the index, and if the calculated total strategy weight for a particular strategy group in the index exceeds the maximum strategy weight, re-adjust the hedge funds included in the index. The system can be further configured to provide a target weight percentage for each strategy group. The system can be further configured to determine a target fund number for each of the strategy groups based on the target strategy weight and the total number of funds included in the index. The strategy groups can include at least one of a convertible arbitrage strategy group, a fixed income arbitrage strategy group, an equity market neutral strategy group, an equity long/short strategy group, a macro strategy group, a managed futures strategy group, a merger/special strategy group, a credit strategy group, and a multi-strategy strategy group.

According to an aspect of the present invention, a method includes calculating a projected hedge fund weight for hedge funds included in the index, the projected hedge fund weight based on an estimate of a weight of the hedge fund over a period. The method also includes determining adjustments to make to one or more of the hedge fund weights based on hedge fund weight limits, determining adjustments to make to strategy weights based on a strategy weight limit, and determining normalization adjustments to make to the index to provide a sum of the projected weights for the funds in the index to equal a specified value.

Embodiments can include one or more of the following. The method can include adjusting the fund weights based on the determined adjustments and re-calculating a projected fund weight for the funds included in the index based on the determined adjustments made to the fund weights, wherein determining what, if any, adjustments need to be made to the strategy weights based on a fund weight allocation can include determining what, if any, adjustments need to be made to the strategy weights based on the re-calculated weights of hedge funds in the hedge fund index. Calculating the projected fund weight can include calculating the fund weight based on an index notional amount. The index notional amount can indicate a total amount invested in products associated with the index. Calculating the projected fund weight can include calculating the fund weight based on outstanding adjustments.

Calculating the projected fund weight can include calculating the projected fund weight according to $$pfw_{m,n}^b = (efw_{m-1,n}^b - \varpi_{m-1,n}^b)\eta_{m-1,n}^b / \eta_{m,n}^b + \sum_{k=1}^{n} \alpha_{m,k} \eta_{m,k}^b / \eta_{m,n}^b$$

where m corresponds to a target month for which the projected fund weight is being calculated, n corresponds to a current month, where n<m, k corresponds to a month in which an adjustment was determined, where k<m, $pfw_{m,n}^b$ corresponds to a Projected Fund Weight of an Index Fund at the beginning of Target Month m as determined in current month n, $efw_{m-1,n}^b$ corresponds to an Estimated Fund Weight of an Index Fund at the beginning of month m−1 determined during the current month n by the Index Administrator based on the latest available information, $\overline{\omega}_{m-1,n}^b$ corresponds to a Residual Weight of an Index Fund at the beginning of month m−1 determined during the current month n, $\eta_{m,n}^b$ corresponds to an Estimated Index Notional Amount at the beginning of the Target Month m determined during the current month n by the Index Administrator based on the latest available information, and $\alpha_{m,k}$ corresponds to an Adjustment determined during a month k with an Effective Date as of the beginning of Target Month m.

Determining what, if any, adjustments need to be made such that a sum of the projected weights for the funds in the index is equal to about 100% can include determining an aggregate reallocation weight. The aggregate reallocation weight ($arw_m$) can be determined according to $$arw_m = 1 - \sum_{f=1}^{x} pfw_m^{bf} - \sum_{f=1}^{x} rw_m^f,$$

where x corresponds to a total number of Index Funds in the Index for the month immediately preceding Target Month m, $pfw_m^{bf}$ corresponds to a Projected Fund Weight of Index Fund f at the beginning of Target Month m, and $rw_m^f$ corresponds to a Residual Weight of Index Fund f for Target Month m.

The method can also include determining if the aggregate reallocation weight is greater than zero. The method can also include, if the aggregate reallocation weight is greater than zero, increasing weights of some of the funds included in the index in a total amount equal to the aggregate reallocation weight. Increasing weights of at least some of the funds in an total amount equal to the aggregate reallocation weight can include increasing fund weights to minimize a difference between the projected strategy weight and the target strategy weight. Increasing weights of at least some of the funds in a total amount equal to the aggregate reallocation weight can include introducing new funds to the index. The method can also include, if the aggregate reallocation weight is less than zero, decreasing weights of some of the funds included in the index in a total amount equal to the aggregate reallocation weight. Decreasing weights of at least some of the funds in a total amount equal to the aggregate reallocation weight can include decreasing fund weights to minimize a difference between the target strategy weight and the projected strategy weight. Decreasing weights of at least some of the funds in a total amount equal to the aggregate reallocation weight can include removing some funds from the index.

In another aspect, the invention includes a computer program product tangibly embodied in an information carrier, for executing instructions on a processor. The computer program product is operable to cause a machine to calculate a projected hedge fund weight for hedge funds included in the index, the projected hedge fund weight based on an estimate of a weight of the hedge fund over a period, determine adjustments to make to one or more of the hedge fund weights based on hedge fund weight limits, determine adjustments to make to strategy weights based on a strategy weight limit, and determine normalization adjustments to make to the index to provide a sum of the projected weights for the funds in the index to equal a specified value.

Embodiments can include one or more of the following. The computer program produce can include instructions to cause a machine to adjust the fund weights based on the determined adjustments and re-calculate a projected fund weight for the funds included in the index based on the determined adjustments made to the fund weights, wherein determining what, if any, adjustments need to be made to the strategy weights based on a fund weight allocation can include determining what, if any, adjustments need to be made to the strategy weights based on the re-calculated weights of hedge funds in the hedge fund index. The instructions to cause the machine to calculate the projected fund weight can include instructions to cause the machine to calculate the fund weight based on an index notional amount, the notional amount indicating a total amount invested in products associated with the index. The computer program produce can include instructions to cause a machine to determine if the aggregate reallocation weight is greater than zero and, if the aggregate reallocation weight is greater than zero, increase weights of some of the funds included in the index in a total amount equal to the aggregate reallocation weight, wherein the instructions to cause the machine to increase weights of at least some of the funds include at least one of instructions to cause the machine to increase fund weights to minimize a difference between the projected strategy weight and the target strategy weight and instructions to cause the machine to introduce new funds to the index. The computer program produce can include instructions to cause a machine to determine if the aggregate reallocation weight is less than zero and, if the aggregate reallocation weight is less than zero, decrease weights of some of the funds included in the index in a total amount equal to the aggregate reallocation weight, wherein the instructions to cause the machine to decrease weights of at least some of the funds in an total amount equal to the aggregate reallocation weight include at least one of instructions to cause the machine to decrease fund weights to minimize a difference between the target strategy weight and the projected strategy weight and instructions to cause the machine to remove some funds from the index.

In another aspect, the invention includes a system configured to calculate a projected hedge fund weight for hedge funds included in the index, the projected hedge fund weight based on an estimate of a weight of the hedge fund over a period, determine adjustments to make to one or more of the hedge fund weights based on hedge fund weight limits, determine adjustments to make to strategy weights based on a strategy weight limit, and determine normalization adjustments to make to the index to provide a sum of the projected weights for the funds in the index to equal a specified value.

Embodiments can include one or more of the following. The system can be further configured to adjust the fund weights based on the determined adjustments and re-calculate a projected fund weight for the funds included in the index based on the determined adjustments made to the fund weights, wherein determining what, if any, adjustments need to be made to the strategy weights based on a fund weight allocation can include determining what, if any, adjustments need to be made to the strategy weights based on the re-calculated weights of hedge funds in the hedge fund index. The system can be further configured to calculate the fund weight based on an index notional amount, the notional amount indicating a total amount invested in products associated with the index.

According to an aspect of the present invention, a method includes calculating a hedge fund weight for a hedge fund included in the index, determining if the calculated hedge fund weight exceeds a fund weight maximum, the hedge fund weight maximum corresponding to a maximum proportion of the total index that can be allocated to a particular fund, determining if the calculated fund weight is less than a minimum hedge fund weight, the minimum fund weight corresponding to a ratio of a required capacity or exposure to the net exposure of the index, and adjusting the percentage of the index allocated to the particular fund if the calculated fund weight exceeds the fund weight maximum or is less than the minimum fund weight.

Embodiments can include one or more of the following. The fund weight maximum can be equal or less than 1% of the total index. The fund weight maximum can be equal or less than a ratio of the capacity to an index notional amount, the capacity corresponding to a total amount that can be invested in the hedge fund and the index notional amount indicating the total monetary amount associated with the hedge fund index. Determining the minimum fund weight can include determining the minimum fund weight based on an amount that can be redeemed from the fund during each particular period. Determining the minimum fund weight can include determining the minimum fund weight based on the notice period. Determining the minimum fund weight can include determining the minimum fund weight based on the redemption frequency and particular dates when the fund can be redeemed. Determining if the calculated fund weight is below the minimum fund weight can include determining if the calculated fund weight is below the minimum fund weight based on the notice period for the fund. Determining the minimum fund weight can include determining the minimum fund weight based on the redemption fees charged by the fund.

Calculating the fund weight can include calculating the fund weight according to $\omega_m^e = \omega_m^b (1+\rho_m)/(1+\kappa_m)$ where $\omega_m^e$ corresponds to a Fund Weight at the end of a Target Month m, $\omega_m^b$ corresponds to a Fund Weight at the beginning of the Target Month m, $\rho_m$ corresponds to a the Net Return of the Index Fund for the Target Month m, and $\kappa_m$ corresponds to an Index Return for the Target Month m. The variable $\kappa_m$ can be calculated based on the weighted average return of all hedge funds in the hedge fund index index. The variable $\kappa_m$ can be calculated according to $$\kappa_m = \sum_{f=1}^{x} \rho_m^f \omega_m^{bf} - \varphi_m$$

where x corresponds to a number of Index Funds in the Index during the Target Month m, $\rho_m^f$ corresponds to a Net Return of Index Fund f during the Target Month m, $\omega_m^{bf}$ corresponds to a Fund Weight of Index Fund f at the beginning of the Target Month m, $\varphi_m$ corresponds to an Index Administration Fee for the Target Month m.

According to an aspect of the present invention, a method includes periodically balancing an index of a plurality of hedge funds by calculating hedge fund weights for the hedge funds included in the index, determining if any of the calculated hedge fund weights exceed a fund weight maximum corresponding to a maximum proportion of the total index that can be allocated the hedge fund, determining if any of the calculated fund weights are less than a minimum proportion of the total index that can be allocated to the hedge fund, and adjusting the percentage of the index allocated to particular ones of the hedge funds, for those hedge funds having a calculated fund weight that exceeds the fund weight maximum or is less than the minimum fund weight.

In another aspect, the invention includes a computer program product tangibly embodied in an information carrier, for executing instructions on a processor. The computer program product is operable to cause a machine to calculate a hedge fund weight for a hedge fund included in the index, determine if the calculated hedge fund weight exceeds a fund weight maximum, the hedge fund weight maximum corresponding to a maximum proportion of the total index that can be allocated to a particular fund, determine if the calculated fund weight is less than a minimum hedge fund weight, the minimum fund weight corresponding to a ratio of a required capacity or exposure to the net exposure of the index, and adjust the percentage of the index allocated to the particular fund if the calculated fund weight exceeds the fund weight maximum or is less than the minimum fund weight.

Embodiments can include one or more of the following. The fund weight maximum can be equal or less than a ratio of the capacity to an index notional amount, the capacity corresponding to a total amount that can be invested in the hedge fund and the index notional amount indicating the total monetary amount associated with the hedge fund index. The instructions to cause the machine to determine the minimum fund weight can include one or more of instructions to cause the machine to determine the minimum fund weight based on an amount that can be redeemed from the fund during each particular period, instructions to cause the machine to determine the minimum fund weight based on the notice period, instructions to cause the machine to determine the minimum fund weight based on the redemption frequency and particular dates when the fund can be redeemed. The instructions to cause the machine to determine if the calculated fund weight is below the minimum fund weight can include the instructions to cause the machine to determine if the calculated fund weight is below the minimum fund weight based on the notice period for the fund based on the redemption fees charged by the fund.

In another aspect, the invention includes a computer program product for balancing an index of a plurality of hedge funds. The computer program product tangibly embodied in an information carrier, for executing instructions on a processor. The computer program product is operable to cause a machine to calculate hedge fund weights for the hedge funds included in the index, determine if any of the calculated hedge fund weights exceed a fund weight maximum corresponding to a maximum proportion of the total index that can be allocated the hedge fund, determine if any of the calculated fund weights are less than a minimum proportion of the total index that can be allocated to the hedge fund, and adjust the percentage of the index allocated to particular ones of the hedge funds, for those hedge funds having a calculated fund weight that exceeds the fund weight maximum or is less than the minimum fund weight.

In another aspect, the invention includes a system configured to calculate a hedge fund weight for a hedge fund included in the index, determine if the calculated hedge fund weight exceeds a fund weight maximum, the hedge fund weight maximum corresponding to a maximum proportion of the total index that can be allocated to a particular fund, determine if the calculated fund weight is less than a minimum hedge fund weight, the minimum fund weight corresponding to a ratio of a required capacity or exposure to the net exposure of the index, and adjust the percentage of the index allocated to the particular fund if the calculated fund weight exceeds the fund weight maximum or is less than the minimum fund weight.

Embodiments can include one or more of the following. The fund weight maximum can be equal or less than a ratio of the capacity to an index notional amount, the capacity corresponding to a total amount that can be invested in the hedge fund and the index notional amount indicating the total monetary amount associated with the hedge fund index. The system can be configured to determine the minimum fund weight based on at least one of an amount that can be redeemed from the fund during each particular period, a notice period, a redemption frequency and particular dates when the fund can be redeemed. The system can be further configured to determine if the calculated fund weight is below the minimum fund weight based on the notice period for the fund based on the redemption fees charged by the fund In another aspect, the invention includes a system for periodically balancing an index of a plurality of hedge funds. The system being configured to calculate hedge fund weights for the hedge funds included in the index, determine if any of the calculated hedge fund weights exceed a fund weight maximum corresponding to a maximum proportion of the total index that can be allocated the hedge fund, determine if any of the calculated fund weights are less than a minimum proportion of the total index that can be allocated to the hedge fund, and adjust the percentage of the index allocated to particular ones of the hedge funds, for those hedge funds having a calculated fund weight that exceeds the fund weight maximum or is less than the minimum fund weight.

According to an aspect of the present invention, a method includes applying a first subset of eligibility rules to a plurality of hedge funds to generate a first subset of the plurality of hedge funds that satisfy the first subset of eligibility rules and subsequent to applying the first subset of eligibility rules, sequentially applying remaining subsets of eligibility rules to the plurality of hedge funds to provide a set of eligible hedge funds that satisfy the applied subsets of eligibility rules to include in the hedge fund index.

Embodiments can include one or more of the following. The method can include providing a set of eligibility rules and grouping the set of eligibility rules into the multiple subsets of eligibility rules. The method can include providing a set of data elements and grouping the set of data elements into the multiple subsets of data elements, each corresponding to a specific subset of eligibility rules. The method can include collecting a first subset of data elements corresponding to the first subset of eligibility rules for the plurality of hedge funds prior to applying the first subset of eligibility rules and sequentially collecting the next subset of data elements for the fund that satisfy all already applied subsets of eligibility rules prior to applying the next subset of eligibility rules. The method can include grouping the eligibility rules in the multiple subsets of eligibility rules based on the availability of the data elements and the cost of collecting missing data elements in each subset of data elements corresponding to each subset of eligibility rules. The method can include removing duplicate hedge fund entities from the plurality of hedge funds prior to applying the first subset of eligibility rules. Removing duplicate entities can include removing duplicate entities based on one or more criteria selected from the group consisting of similar entity names for the hedge fund entities, similar addresses for the hedge fund entities, similar assets under management for the hedge fund entities, and historical returns for the hedge fund entities.

In another aspect, the invention includes a computer program product tangibly embodied in an information carrier, for executing instructions on a processor. The computer program product is operable to cause a machine to apply a first subset of eligibility rules to a plurality of hedge funds to generate a first subset of the plurality of hedge funds that satisfy the first subset of eligibility rules and subsequent to applying the first subset of eligibility rules, sequentially apply remaining subsets of eligibility rules to the plurality of hedge funds to provide a set of eligible hedge funds that satisfy the applied subsets of eligibility rules to include in the hedge fund index.

Embodiments can include one or more of the following. The computer program product can include instructions to cause the machine to provide a set of eligibility rules and grouping the set of eligibility rules into the multiple subsets of eligibility rules. The computer program product can include instructions to cause the machine to provide a set of data elements and grouping the set of data elements into the multiple subsets of data elements, each corresponding to a specific subset of eligibility rules. The computer program product can include instructions to cause the machine to collect a first subset of data elements corresponding to the first subset of eligibility rules for the plurality of hedge funds prior to applying the first subset of eligibility rules and sequentially collect the next subset of data elements for the fund that satisfy all already applied subsets of eligibility rules prior to applying the next subset of eligibility rules. The computer program product can include instructions to cause the machine to group the eligibility rules in the multiple subsets of eligibility rules based on the availability of the data elements and the cost of collecting missing data elements in each subset of data elements corresponding to each subset of eligibility rules. The computer program product can include instructions to cause the machine to remove duplicate hedge fund entities from the plurality of hedge funds prior to applying the first subset of eligibility rules. The computer program product can include instructions to cause the machine to remove duplicate entities based on one or more criteria selected from the group consisting of similar entity names for the hedge fund entities, similar addresses for the hedge fund entities, similar assets under management for the hedge fund entities, and historical returns for the hedge fund entities.

In another aspect, the invention includes a system configured to apply a first subset of eligibility rules to a plurality of hedge funds to generate a first subset of the plurality of hedge funds that satisfy the first subset of eligibility rules and subsequent to applying the first subset of eligibility rules, sequentially apply remaining subsets of eligibility rules to the plurality of hedge funds to provide a set of eligible hedge funds that satisfy the applied subsets of eligibility rules to include in the hedge fund index.

Embodiments can include one or more of the following. The system can be further configured to provide a set of eligibility rules and grouping the set of eligibility rules into the multiple subsets of eligibility rules. The system can be further configured to provide a set of data elements and grouping the set of data elements into the multiple subsets of data elements, each corresponding to a specific subset of eligibility rules. The system can be further configured to collect a first subset of data elements corresponding to the first subset of eligibility rules for the plurality of hedge funds prior to applying the first subset of eligibility rules and sequentially collect the next subset of data elements for the fund that satisfy all already applied subsets of eligibility rules prior to applying the next subset of eligibility rules. The system can be further configured to group the eligibility rules in the multiple subsets of eligibility rules based on the availability of the data elements and the cost of collecting missing data elements in each subset of data elements corresponding to each subset of eligibility rules. The system can be further configured to remove duplicate hedge fund entities from the plurality of hedge funds prior to applying the first subset of eligibility rules. The system can be further configured to remove duplicate entities based on one or more criteria selected from the group consisting of similar entity names for the hedge fund entities, similar addresses for the hedge fund entities, similar assets under management for the hedge fund entities, and historical returns for the hedge fund entities.

Features and advantages of the invention are in the description, drawings and claims.

DETAILED DESCRIPTION

Figure 1:
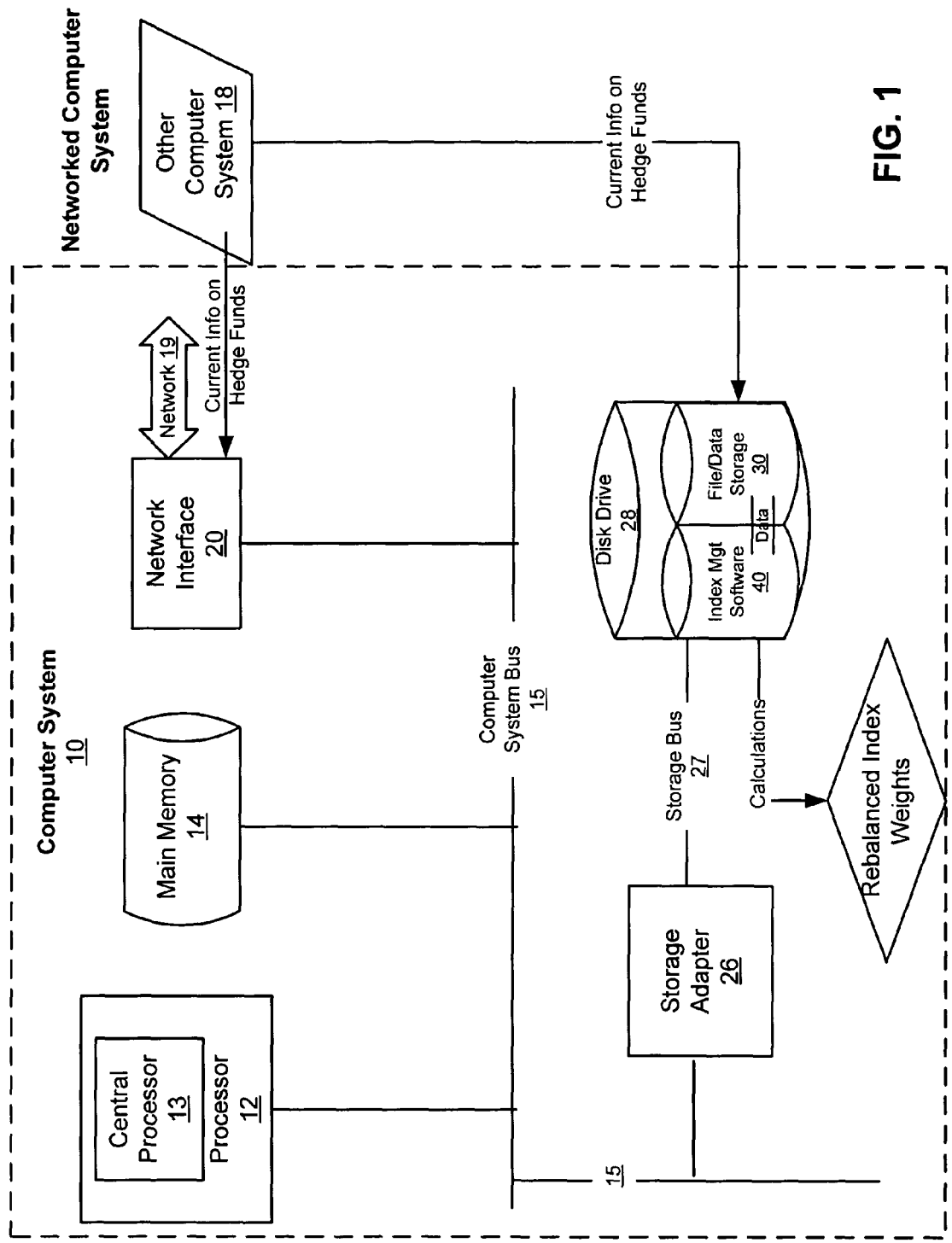
FIG. 1 is a block diagram of a computer system.

Referring to FIG. 1, a computer system 10 includes a processor 12 including a central processor unit 13 and a main memory 14 interconnected by a computer system bus 15. In addition, the computer system 10 has a network interface 20 coupled via a network 19 to another computer system 18. The computer system 10 further includes a storage adapter 26 coupled to the computer system bus 15 and coupled to a disk drive 28 via a storage bus 27. Computer system 18 illustratively provides computer system 10 with current information regarding hedge funds. This information can be communicated over the network 19 to the interface 20. The information can be stored as a file or data structure 30 on the mass storage device 28.

The mass storage device 28 also includes index rebalancing software 40. Index rebalancing software uses the information in file 30 to produce rebalancing index weights for each hedge fund in a hedge fund index.

The above-described architecture is that of a general purpose, networked computer system. It should be understood that any type of computer system such as a server or non-network personal computer system provided with the information regarding current characteristics of a large group of hedge funds (sometimes referred to as a hedge fund Universe) could be used to operate the index management software 40, e.g., perform all or part of the functions of an index administrator.

The process of index construction and maintenance can be viewed as a process resulting in assigning non-negative weights to each fund in the hedge fund Universe for each calculation period. The funds that are assigned positive weight are said to be "included in the index". The funds that are assigned zero weight are said to be "excluded" from the index. This assignment of weights is performed at the start of each calculation period.

In general, the hedge fund index is governed by an index administrator that is responsible for the construction, valuation, and maintenance of the hedge fund index through application of the rules. Thus, the hedge fund index is governed by a set of rules included in the index rebalancing software 40 that outline a process to weight funds according to multiple strategy groupings. According to one embodiment, the hedge fund index is a notional hedge fund index, as detailed below. In general, a notional index takes into account an actual, real-world cash flow when determining the funds and weights of the funds in the hedge fund index. The cash flows are represented as a notional amount that specifies a total amount currently represented by the funds in the hedge fund index. The index rebalancing software 40 includes rules that provide guidelines for the index rebalancing software 40 to determine what funds to include in the hedge fund index and to determine a relative weight for the funds included in the hedge fund index (as described below).

Index Valuation

The index funds constitute a subset of the funds available on the market (e.g., the Universe of hedge funds). The process of index valuation can be viewed as a process of determining returns to each hedge fund in the Universe for the calculation period and using these returns and assigned weights to determine returns and values of the index.

Once the weights at the start of the period and returns for the period are determined, the return of the index for the period may be determined as the weighted average return across all funds in the universe in accordance with the following formula:

$$\kappa_m = \sum_{m=1}^{x} \rho_m \omega_m^b$$

where:
$\kappa_m$ represents the return of the index for the period,
x represents the number of funds in the Universe,
$\omega_m^b$ represents the weight of the fund m at the beginning of the period, and
$\rho_m$ represents the return of the fund m during the period.

The weights of the funds at the end of the period are determined according to the following formula:

$$\omega_m^e = \omega_m^b (1+\rho_m)/(1+\kappa_m)$$

Where:
$\omega_m^e$ represents the weight of fund m at the end of a period.

After that this iterative process can be repeated for the next calculation period.

Hedging Index Exposure

The index provider gives investors an ability to obtain economic exposure to the index by issuing structured products linked to the index. In a simplified example of such a product, consider a swap with notional amount (e.g., a notional amount is the total exposure of the index provider to index linked structured products) of $100M, where the index provider pays the investor the monthly return on the index multiplied by $100M, while investor pays the index provider 500,000. If the index return for this month is 1%, the cash flow of the index provider is −$500,000.

To avoid potential losses, the index provider will typically try to create a hedge. For example, the index provider will borrow $100M and invest the $100M into index funds in proportion matching the weights of these funds in the index. Assuming that the index provider has to pay $300,000 interest on the borrowed 100M, the cash flow of the index provider will be:

$0.5M swap payments from investor
$1M return on the hedge
($0.3M) interest on borrowed $100M
($1M) swap payment to the investor so that the index provider earns 0.2M dollars, and, given that index provider created a perfect hedge, these earnings do not depend on the index return.

The index provider may either not be able to invest all $100M in index funds or may not be able to match the weights of the funds in the index exactly. For example, if some of the index funds do not accept investments during this particular period the index provider will not be able to match the weights of those funds in the index. As the result of such liquidity limitations the hedge is not perfect and there can be a difference between the index return and the hedge return. This difference is often referred to as a tracking error. Thus, the $0.2M profit is not guaranteed and the index provider bears the risk associated with the mishedge.

At the expiration of the swap the index provider needs to liquidate the hedge. This may prove difficult or impossible to do if, for example, some of the funds in the index have lock-ups, allow redemptions only quarterly, or require a long notice period. These liquidity limitations which are common for hedge funds create another source of risk for the index provider, namely residual exposure.

One way for an index administrator to avoid tracking error and the associated risk is to limit the choice of funds for the index to only those funds that provide a reasonable guarantee that either there will be no tracking error or at least that the tracking error will be very small. This approach, however, can lead to the index being not representative of the hedge funds in the market. Another approach is to create an index that explicitly takes into account capacity and liquidity limits associated with investing in hedge funds.

Index Rebalancing

The weights of the hedge funds included in the index change with time due to differences in performance of individual hedge funds. This may lead to the index being out of balance in terms of the weights of individual hedge funds, as well as in terms of the strategy weights (as described below). The process by which the index administrator brings the weights of individual funds and strategies back to the target ranges is called index rebalancing.

In different embodiments, the rules may require rebalancing every calculation period, e.g., daily or monthly rebalancing, or require rebalancing less frequently, e.g., quarterly or annually. In some cases, the rules may specify that the types of rebalancing transactions depended on the period. For example, during monthly rebalancing funds can be only removed from the index (e.g., the fund weight set to 0), while other changes to the fund weights may be allowed quarterly or annually.

Thus, the hedge fund index is governed by a set of rules programmed in the index management software 40 that outline a process to weight funds and valuation of the index.

According some embodiments, the hedge fund index is a exposure-driven hedge fund index, as detailed below. In general, an exposure-driven index takes into account the total exposure of the index provider to the index-linked structured products and actual, real-world capacity and liquidity limits when determining the weights of the funds in the hedge fund index. These limits may be expressed in dollars or as proportions of the total index provider's exposure to the index.

The index rebalancing software 40 includes rules that provide guidelines for the index rebalancing software 40 to determine what funds to include in the hedge fund index and to determine relative weights for the funds included in the hedge fund index by taking into account capacity and liquidity limits as described below.

Figure 2:
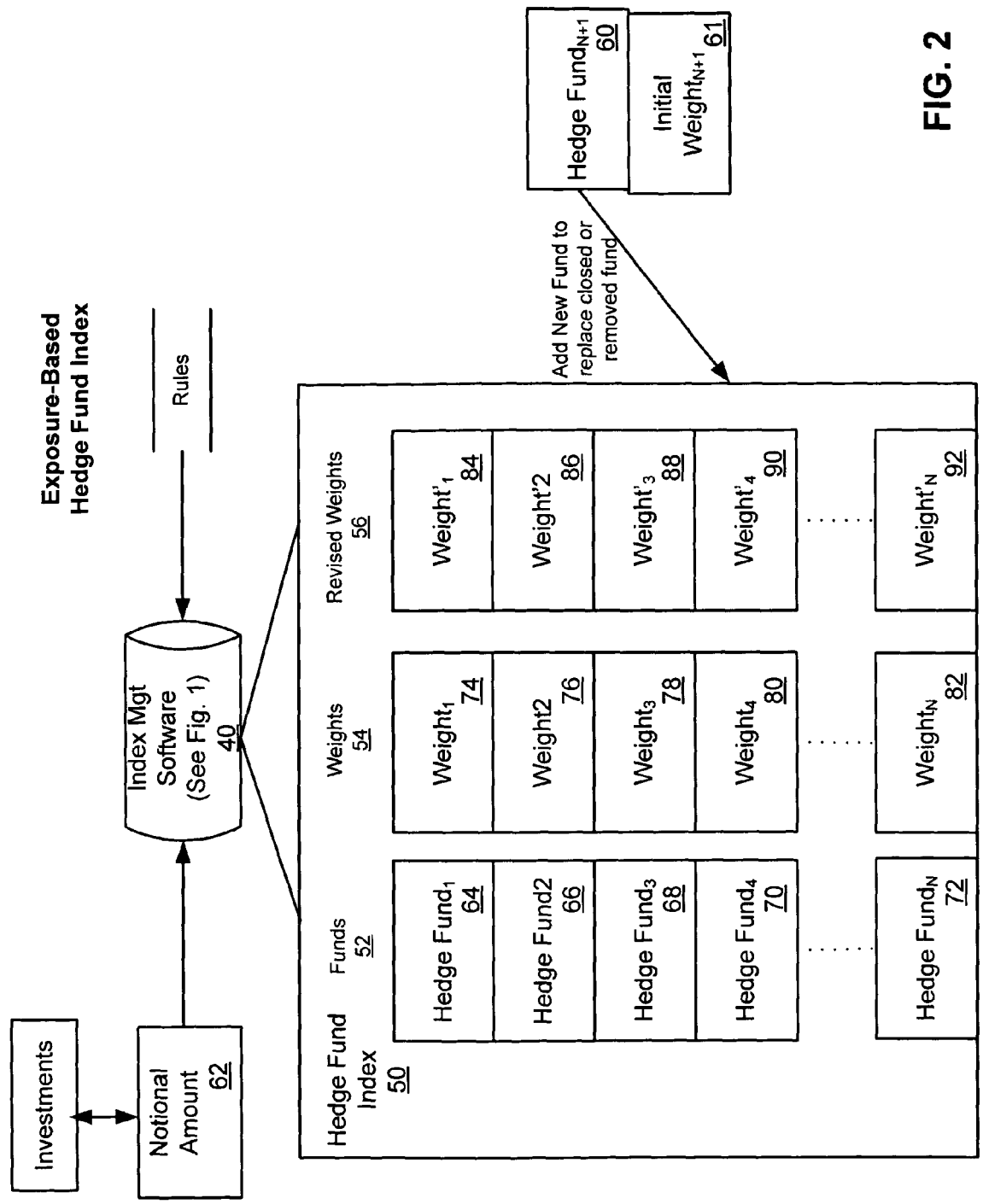
FIG. 2 is a block diagram that diagrammatically depicts a hedge fund index.

Referring to FIG. 2, a representation of an exposure-driven hedge fund index is shown. The exposure-driven hedge fund index includes multiple hedge funds (e.g., hedge funds 64, 66, 68, 70, and 72). Each of the hedge funds has an associated weighs (e.g., weights 74, 76, 78, 80, and 82) that represents the proportion (e.g., a percentage) of the index allocated to the fund.

Both the hedge funds included in the hedge fund index and the weights of the funds can vary over time based on performance of a particular hedge fund and the operation and implementation of a set of rules that govern the hedge fund index (e.g., as indicated by revised weights 84, 86, 88, 90, and 92).

In general, the composition of the hedge fund index is determined based on a set of rules as opposed to being subjectively selected by an individual through an investment entity. Therefore, the hedge fund index and the resulting performance can be based on a mathematical model (specified by the rules) rather than the result of an actual investment.

In order to determine the funds 52 to include in the hedge fund index and the weights 54 of those funds, the hedge fund index combines abstract rules taking into account changes in exposure of the index provider to the index and capacity and liquidity limits. The rules allow a computer to make choices similar to the choices made for an actual fund of investments by stipulating if a fund is included in the hedge fund index (or removed from the index) and by specifying how the fund should be weighted relative to other funds and how the weights should be changed as the result of rebalancing.

The total exposure of the index provider to index linked structured products (expressed in an appropriate currency) is often called index notional amount. At any given moment index notional amount can be viewed as the total amount that needs to be invested in the hedge funds comprising the hedge fund index on pro-rata basis in order to give the index provider a perfect protection against any changes in the value of the index-linked structured products caused by changes in the index level. The portfolio of these investments is called the hedge.

For example, let's assume that the notional amount 62 increases by $100M. In the absence of liquidity limits the index provider can invest $100M in the funds 52 on pro-rata basis, thereby maintaining protection against any future changes in the index level, i.e., maintaining a perfect hedge. So, there is no need to change the weights 54 of the funds 52 in the index.

In reality one or more funds 52 may not accept additional investments during this particular period or may be even completely closed to new investments, making pro-rata distribution impossible and creating differences in the weights of the funds in the index and in the hedge. Consequently, if the index weights 54 do not change, the index provider becomes exposed to a risk associated with the difference in performance of the hedge fund index and the performance of the hedge, called a mishedge risk.

This event is modeled by assigning each of these funds a corresponding capacity limit. The computer program 40 generates revised weights 56 for the funds 52 included in the hedge fund index 50 by modeling allocation of the additional money across the hedge funds by taking into account the total amount to be allocated as well as capacity limits applicable for each fund. This process leads to determination of revised weights for the funds in the hedge fund index, including possibly adding new funds to the index.

In another example, let's assume that the notional amount is decreased by $100M and pro-rata redemptions from the hedge are impossible due to the fact that some of the funds do not allow redemptions during this particular period. This event is modeled by assigning each of these funds a corresponding liquidity limit. The computer program generates new weights and/or removes funds from the hedge fund index to account for the reduction in the index notional amount 62 while taking into account the liquidity limits.

For example, if hedge fund 70 had a current weight 80 of 1% and the notional amount was doubled; the doubling of the notional amount would cause the weight of fund 70 to decrease to 0.5%. If hedge fund 70 would accept new investments, then the weight of hedge fund 70 would increase back to 1%. However, if the hedge fund 70 was closed to new investment at the time the notional amount was doubled, then the weight 90 of hedge fund 70 would remain at 0.5%. This provides the advantage of allowing the index to be tied to a real limitations (i.e., the liquidity and capacity) but at the same time keep hedge funds that have limited capacity or closed to new investment in the index.

The remaining 0.5% of the total notional amount may be distributed in some manner among the funds in the index that do have additional capacity or may be allocated to a new fund 60 such that the initial weight of fund 60 would be 0.5%. New fund 60 would then be added to the list of hedge funds 52 and would subsequently be adjusted in weight in a manner similar to the funds initially included in the index.

Usage of Exposure-Driven Index

The exposure-driven hedge fund index 50 generates a representative benchmark of the performance of the hedge fund asset class because it simulates the real-life behavior of a hedge fund investor that encounters Capacity and Liquidity limits. The exposure-driven hedge fund index 50 also allows to keep in the index hedge fund with very stringent capacity and liquidity limits (such as closed funds) and allows to increase the number of funds in the index. The number of funds in the index is limited only by the operational infrastructure of the index provider, rather than by the availability of funds with high Capacity and low Liquidity limits. The exposure-driven hedge fund index 50 also references the returns of actual hedge funds, as opposed to returns of managed accounts that are trying to replicate the returns of a hedge fund.

At the same time Exposure-driven index provides the index provider with an opportunity to maintain a manageable tracking error as described below, thereby enabling the index provider to produce and offer "index linked structured products."

For example, such product may be an option that provides a buyer a return based on the performance of the index. Such an option would guarantee the buyer a return corresponding to changes in the value of the hedge fund index.

While the buyer's profit or loss is tied to the index, the index provider is not required to invest the money into the funds represented in the hedge fund index. For example, the index provider may choose to allocate the option sale proceeds in the index funds in accordance with the weight of each fund in the index, thereby minimizing its tracking error end risk. Alternatively, the index provider may choose not to allocate the received money according to the funds weights in the hedge fund index, but to invest all or part of the money received from the sale of the option in non-index funds or other types of investment vehicles, thereby assuming the tracking risk but, presumably, expecting excess returns from such allocation. In any case, the investment of the proceeds of option sale and the choice of the level of risk is made by the index provider according to his risk appetite/aversion. Thus, the risk associated with the sale of index linked structured products is manageable.

Although the index administrator does not necessarily invest the money into the funds represented by the index, the hedge fund index is adjusted (according to the rules) to reflect the additional investment through the increase in the notional amount.

Index Formation Process

Figure 3:
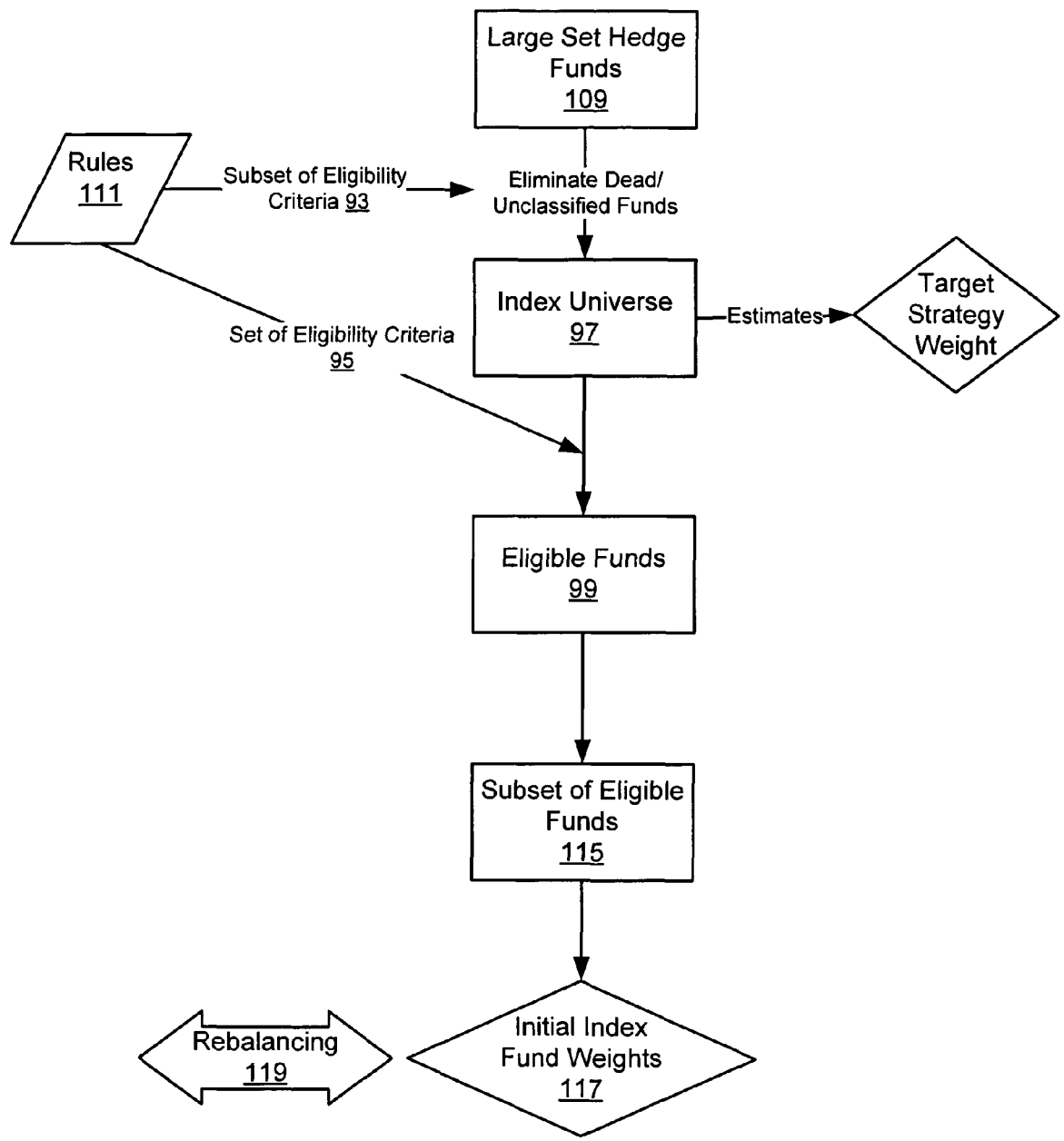
FIG. 3 depicts an initial index forming process.

Referring to FIG. 3, an index formation process 107 is shown. Index formation process 107 includes filtering data about hedge funds from a large set of hedge funds 109 to select a group of eligible hedge funds according to rules 111. The filtering can be a multi-step process.

In an example of a two-step filtering process, at the first step a subset of eligibility criteria 93 is applied to the large set of hedge funds 109. This filtering eliminates funds that are no longer in operation and funds that can not be classified in one of the index strategies. The first step results in a subset of hedge funds called index Universe 97. The index Universe 97 provides the broadest representation of the hedge fund industry and, in addition to being a source of the hedge funds for the index can be used to estimate the proportion of total assets under management (AUM) invested in each of the strategies. These proportions are called target strategy weights for each strategy. At the second step a subset of the Universe, referred to as a set of eligible funds 99, is generated by applying a set of eligibility criteria 95. Based on the set of eligible funds, process 107 selects a subset of hedge funds 115 from the eligible hedge funds. The hedge funds are selected to represent various investment strategies and target strategy weights (as described below). Process 107 also includes determining 117 an initial weight of each of the hedge funds in the hedge fund index. The initial weights assigned to each of the hedge funds can vary over time based on various factors such as the performance of the hedge fund and changes due to rebalancing 119 the index, as discussed below.

As described above, the hedge funds included in the hedge fund index can be selected to represent a cross-section of various domiciles, currencies, classes, and/or strategies. In general, hedge funds that are managed in a similar manner or have other unifying characteristics are grouped into a particular sector and particular strategy. Hedge funds in a particular strategy use similar investment strategies and, therefore, exhibit similar potential risks and potential rewards (e.g., similar losses and gains).

Figure 4:
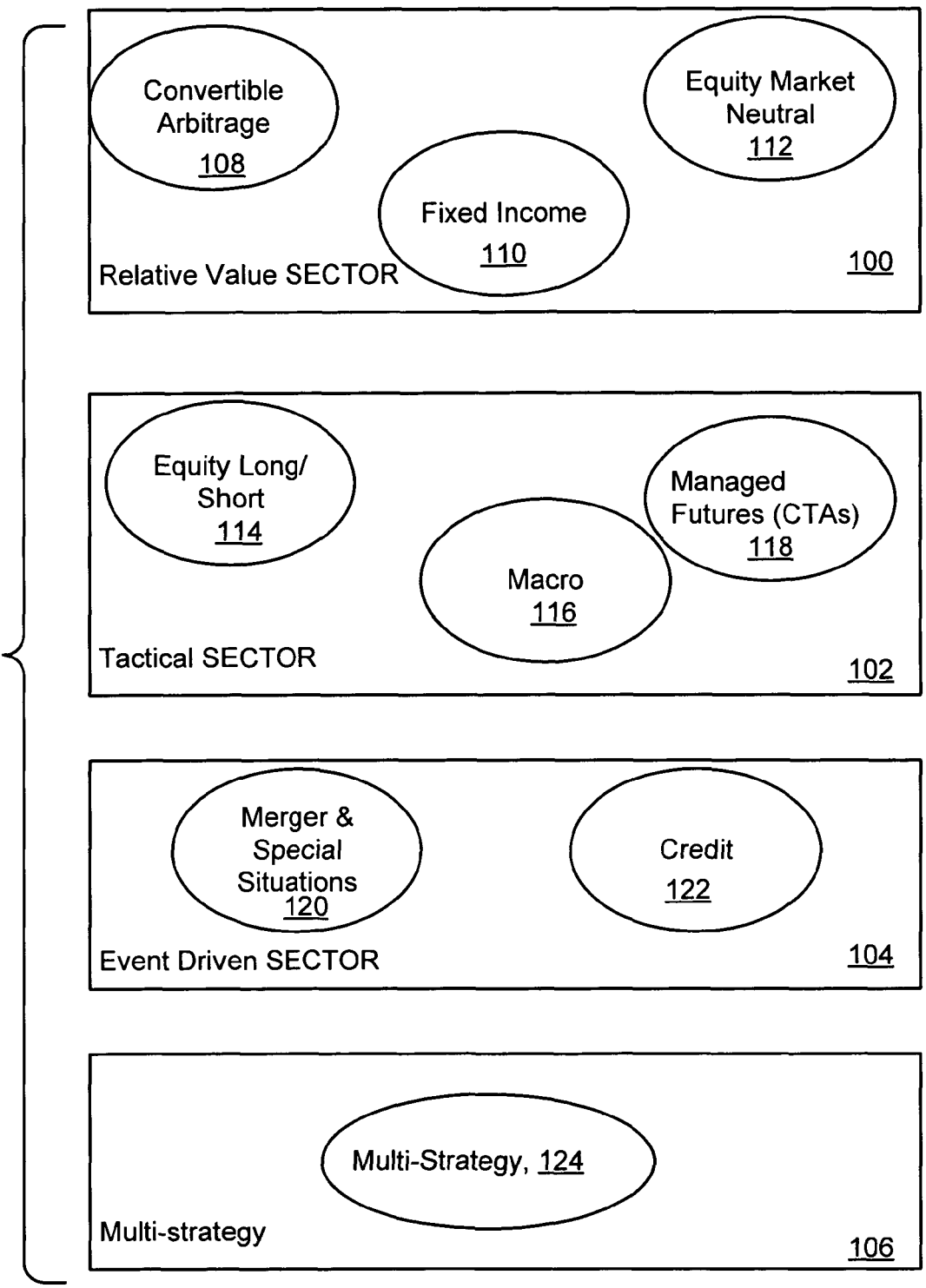
FIG. 4 is a block diagram that depicts a relationship between sectors and strategies.

Referring to FIG. 4, the hedge fund index is comprised of multiple sectors (e.g., relative value sector 100, tactical sector 102, event driven sector 104, and multi-strategy sector 106). Each sector comprises multiple strategies. For example, the relative value sector 100, comprises a convertible arbitrage strategy 108, a fixed income strategy 110, an equity market neutral strategy 112. The tactical sector 102 comprises an equity long/short strategy 114, a macro strategy 116, and a managed futures strategy 118. The event driven sector 104 comprises a merger and special situations strategy 120 and a credit strategy 122. The multi-strategy sector 106 includes a single multi-strategy strategy 124.

The actual hedge funds 52 selected to represent the hedge fund index are selected from the multiple strategies, 108, 110, 112, 114, 116, 118, 120, 122 and 124.

Each strategy is allocated a percentage of the total index. The percentage allocation can vary among the strategies. For example, hedge funds from one strategy may make up a larger percentage of the hedge fund index than hedge funds of another strategy.

The weights for the hedge funds in the hedge fund index are based on target percentages for each of the strategies 108, 110, 112, 114, 116, 118, 120, 122, and 124. These target percentages can vary between the various strategies.

The number of funds in each strategy is determined according to the rules. In general, selecting the funds included in the hedge fund index from the multiple sectors and strategies generates a diversified hedge fund index.

Depending on the particular implementation, number of funds in each strategy can be equal, proportional to the target strategy weights, or determined based on other rules, including rules designed to maximize the benefits of diversification while using a minimal number of funds.

In a particular embodiment, the relative value sector 100 includes the convertible arbitrage strategy 108, the fixed income strategy 110, and the equity market neutral strategy 112. In general, the relative value sector focuses on the exploitation of price inefficiencies in a variety of markets and typically includes taking a combination of long and short position in various financial instruments in a way that the net portfolio exposure is minimized.

The convertible arbitrage strategy 108 is identified by investment in the convertible securities of a company. The convertible arbitrage strategy investments often involve the simultaneous purchase of a portfolio of convertible bonds and sale of short the corresponding equity shares. Managers may hedge or trade a portion of the interest rate and credit risk through instruments such as interest rate swaps, treasuries, credit default swaps and asset swaps. The convertible arbitrage strategy 108 also includes relative value options trading.

The fixed income arbitrage strategy 110 involves the exploitation of price inefficiencies in a variety of fixed income securities. The fixed income arbitrage strategy 110 focuses on profits from price anomalies between the interest rates of related securities. Trading strategies may include, but are not limited to, yield curve arbitrage, government bond arbitrage, and directional trades, sovereign and corporate credit trading, mortgage arbitrage and cash versus futures.

The equity market neutral strategy 112 involves taking long and short positions in various equities in an attempt to benefit from relative price inefficiencies. In general, the market neutral strategy 112 funds are selected to be either beta neutral, currency neutral, or both. The investment approach may be either discretionary or systematic, and the portfolio will generally have a low net dollar and/or beta exposure.

The tactical sector 102 includes the equity long/short strategy 114, the macro strategy 116, and the managed futures strategy 118. In general, the tactical sector 102 focuses on capitalizing on short, intermediate, and long term market trends, as well as exploiting inefficiencies in pricing of individual securities. At any given time the portfolio typically contains both long and short position, but the net exposure may nevertheless be substantial.

The Equity Long/Short strategy 114 involves the purchase of equities that are viewed as under-valued and the short sale of equities that are viewed as over-valued. Thus, the equity long/short strategy 114 is not market neutral, but instead focuses on investing on both the long and short sides of the market. The investment approach is generally discretionary and the portfolio may be net long or net short.

The Macro strategy 116 involves discretionary trading in the global currency, interest rate, equity, and commodity markets to take advantage of directional movements using primarily a fundamental approach. Macro strategy 116 positions are often influenced by major economic trends and/or events. Managers may utilize a wide variety of instruments in order to effect their positions.

The Managed Futures strategy 118 involves systematic trading in the global currency, interest rate, equity and commodity markets to take advantage of directional movements using primarily a technical approach based on price and market specific information. System inputs are technical and/or fundamental and trends are generally identified using a variety of forecasting models. Trades are most often executed in the futures markets.

The event driven sector 104 includes the merger and special situations strategy 120 and the credit strategy 122. In general, the event driven sector 104 focuses on investing based on special situations that cause a price movement.

The Merger/Special Situations strategy 120 involves investing in opportunities created by major corporate events such as, for example, acquisitions, spin-offs, bankruptcies, reorganizations, recapitalizations, and/or share buy-backs. Managers invest through a variety of securities including common equity, preferred equity, investment grade debt, distressed debt, convertible bonds and options. Trades may be both relative value and directional.

The credit strategy 122 involves buying and selling short various credit qualities of corporate debt, including distressed, high yield and investment grade. The credit strategy 122 can also involve buying and selling credit related products such as credit default swaps, asset swaps, and credit indices. Trades may be both relative value and/or directional.

The Multi-Strategy sector 106 includes a multi-strategy strategy 124. The multi-strategy strategy 124 contains funds that allocate a part of their assets to several strategies. In some embodiments, the multi-strategy strategy 124 focuses on combining exposure to the most common hedge fund strategies such as fixed income arbitrage, merger/special situations, credit, macro, managed futures and equity long/short.

Target Strategy Weight

Figure 5:
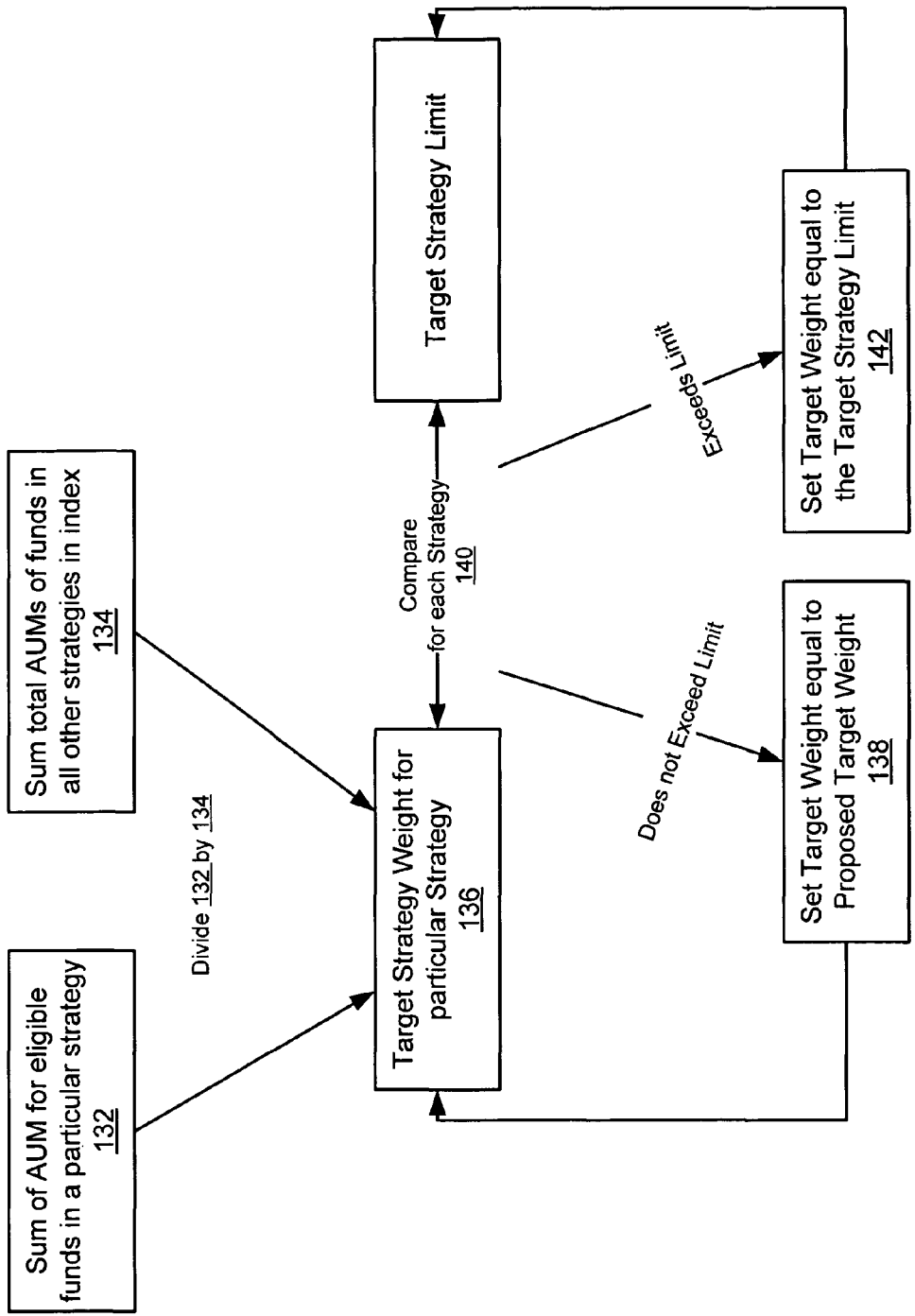
FIG. 5 is a flow chart for determining target strategy weights.

Referring to FIG. 5, an exemplary process 130 for determining target strategy weights (e.g., the preferred or desired percentage of the hedge fund index represented by a particular strategy in the index) for the strategies 108, 110, 112, 114, 116, 118, 120, 122, and 124 is shown. The weights are determined based on the estimated total monetary amount invested in hedge funds classified under the particular strategy, called asset under management or AUM.

The "target strategy weight" for a particular strategy is about equal to the ratio AUM for a particular strategy to the total assets under management of all hedge funds that belong to one of the strategies represented in the index.

In order to avoid short term changes to the target strategy weight additional measures can be taken. For example, a more or less sophisticated method of smoothing of short term fluctuation can be used. In the simples case—smoothing with a moving average, the ratio AUM for a particular strategy to the total assets under management of all other funds that belong to one of the strategies represented in the index can be averaged across certain period.

In order to calculate the target strategy weight, the process 130 calculates 132 a sum of the assets under management for the eligible funds in a particular strategy and calculates 134 a sum of the total assets under management for the funds for all of the other strategies included in the index. The target strategy weight for a particular strategy is equal to the sum of the assets under management for the strategy divided 136 by the total assets under management. The target strategy weights can be re-determined on a regular basis, e.g., weekly, monthly, quarterly, or yearly.

In some embodiments, a maximum weight, also referred to as a target strategy weight limit, can be assigned to each strategy. Setting a target strategy weight limit ensures that a particular strategy does not disproportionately influence the performance of the hedge fund index. If a target strategy weight is set for a particular strategy, after calculating 136 the ratio of the sum of the assets under management for the strategy to the total assets under management, the process 130 compares 140 the calculated value to the target strategy limit for the strategy. If the calculated value is greater than the target strategy limit, the process 130 sets 142 the target weight for the strategy equal to the target strategy limit. If the calculated value is less than or equal to the target strategy limit, the process 130 sets 138 the calculated value as the target weight for the strategy.

Figure 6:
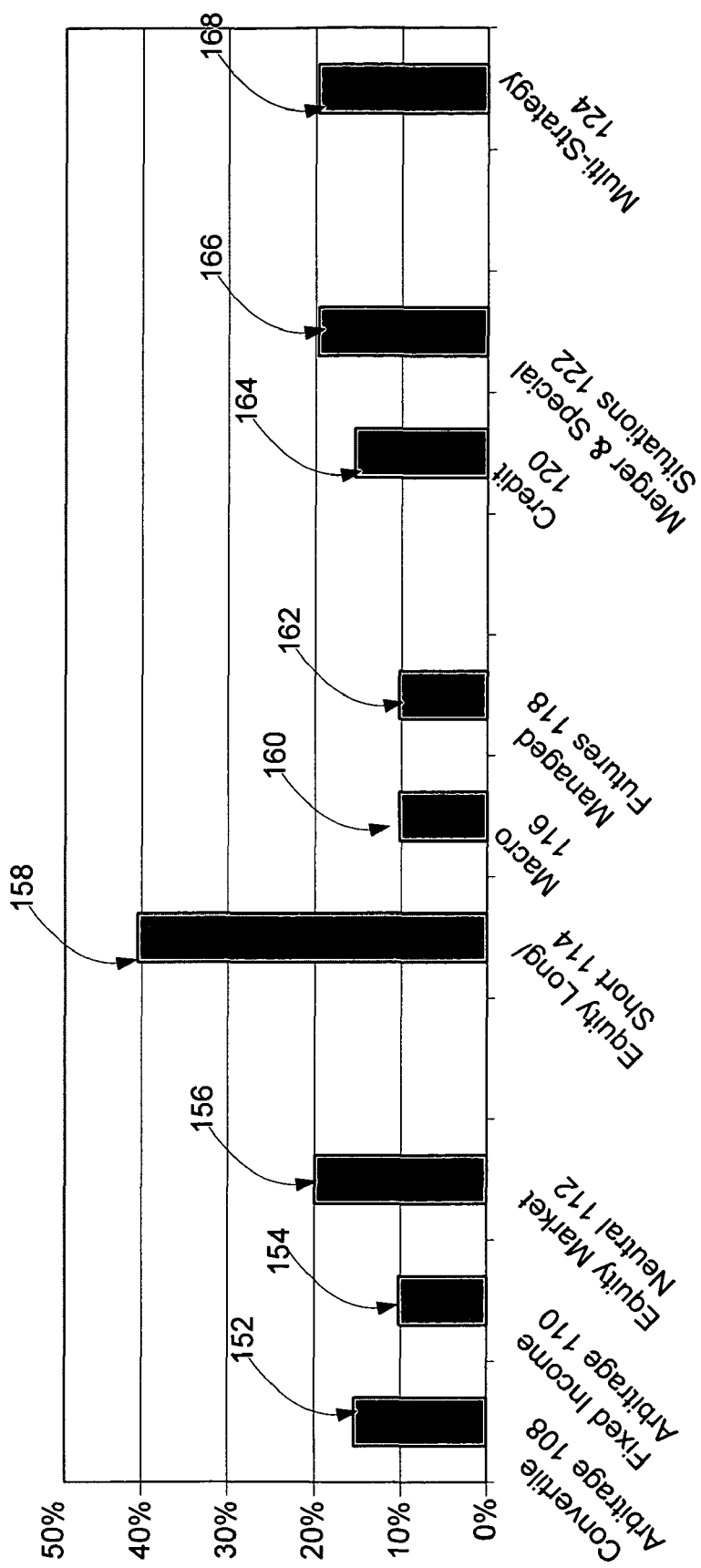
FIG. 6 is a chart of exemplary target strategy weight limits for each of the strategies of FIG. 4.

Referring to FIG. 6, exemplary target strategy weight limits 150 for each of the strategies 108, 110, 112, 114, 116, 118, 120, 122, and 124 are shown. The convertible arbitrage target strategy weight limit 152 for the convertible arbitrage strategy 108 is between about 10% and 20% (e.g., about 15%). The fixed income arbitrage target strategy weight limit 154 for the fixed income arbitrage strategy 110 is between about 5% and 15% (e.g., about 10%). The equity market neutral target strategy weight limit 156 for the equity market neutral strategy 112 is between about 15% and 25% (e.g., about 20%). The equity long/short target strategy weight limit 158 for the equity long/short strategy 114 is between about 35% and 45% (e.g., about 40%). The macro target strategy weight limit 160 for the macro strategy 116 is between about 5% and 15% (e.g., about 10%). The managed futures target strategy weight limit 162 for the managed futures strategy 118 is about 10%. The credit target strategy weight limit 164 for the credit strategy 120 is between about 10% and 20% (e.g., about 15%). The merger/special situations target strategy weight limit 166 for the merger/special situations strategy 122 is between about 15% and 25% (e.g., about 20%). The multi-strategy target strategy weight limit 168 for the multi-strategy strategy 124 is between about 15% and 25% (e.g., about 20%).

The assignment of target strategy weight limits typically determined based on risk management considerations and reflect the understanding of the relative risks of investing in a particular strategy, as well as diversification benefits of investing in combination of particular strategies.

Figure 7:
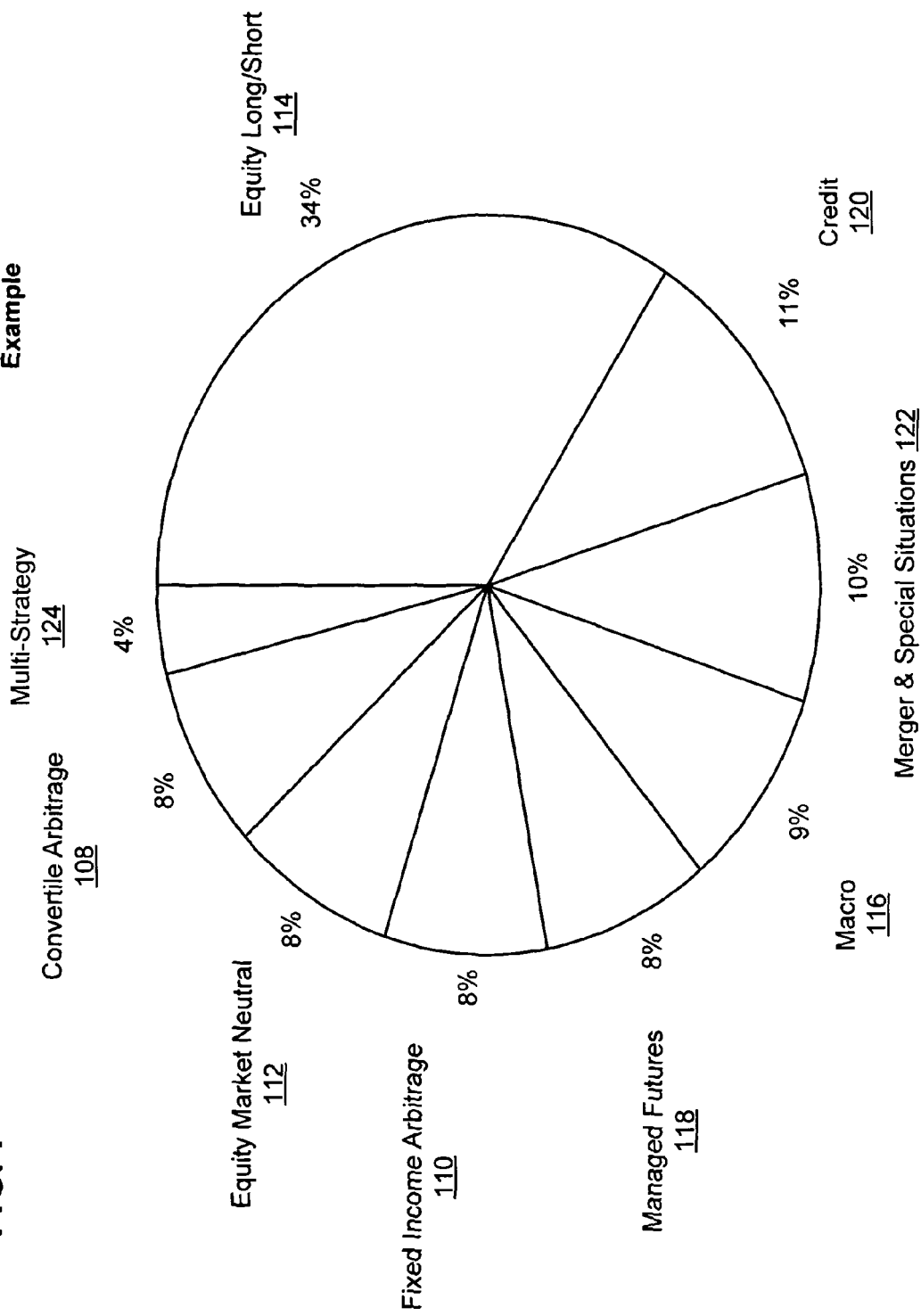
FIG. 7 is a chart of exemplary weights of the strategies of FIG. 4.

Referring to FIG. 7, an exemplary weights of the strategies 108, 110, 112, 114, 116, 118, 120, 122, and 124 is shown. In this example, 34% of the hedge fund index is composed of funds in the equity long/short strategy 114, 11% of the hedge fund index is composed of funds in the credit strategy 120, 10% of the hedge fund index is composed of funds in the merger/special situations strategy 122, 9% of the hedge fund index is composed of funds in the macro strategy 116, 8% of the hedge fund index is composed of funds in the managed futures strategy 118, 8% of the hedge fund index is composed of funds in the fixed income arbitrage strategy 110, 8% of the hedge fund index is composed of funds in the equity market neutral strategy 112, 8% of the hedge fund index is composed of funds in the convertible arbitrage strategy 108, and 4% of the hedge fund index is composed of funds in the multi-strategy strategy 124.

Number of Funds

The weight of each strategy in the index can be achieved by including a certain number of funds belonging to this strategy in the index. In the particular implementation, in order to determine the actual number of funds to include in the hedge fund index for each of the strategies 108, 110, 112, 114, 116, 118, 120, 122, and 124, the overall target fund number (e.g., the total number of hedge funds to be included in the index) is multiplied by the target strategy weight and rounded to the nearest integer, yielding the target fund number for each strategy. This approach provides a consistent way of increasing capacity of the index by simply increasing the overall target number.

However, as described below as a result of the application of the rules, the actual number of index funds representing a particular strategy may be greater than or less than the target number, and, consequently, the actual number of funds in the hedge fund index may be greater than or less than the overall target fund number.

In other implementations the target fund number for each strategy can be determined differently, for example, the target fund number can be explicitly specified by the rules based on the results of a Monte Carlo simulation.

Selection of Eligible Funds

Figure 8:
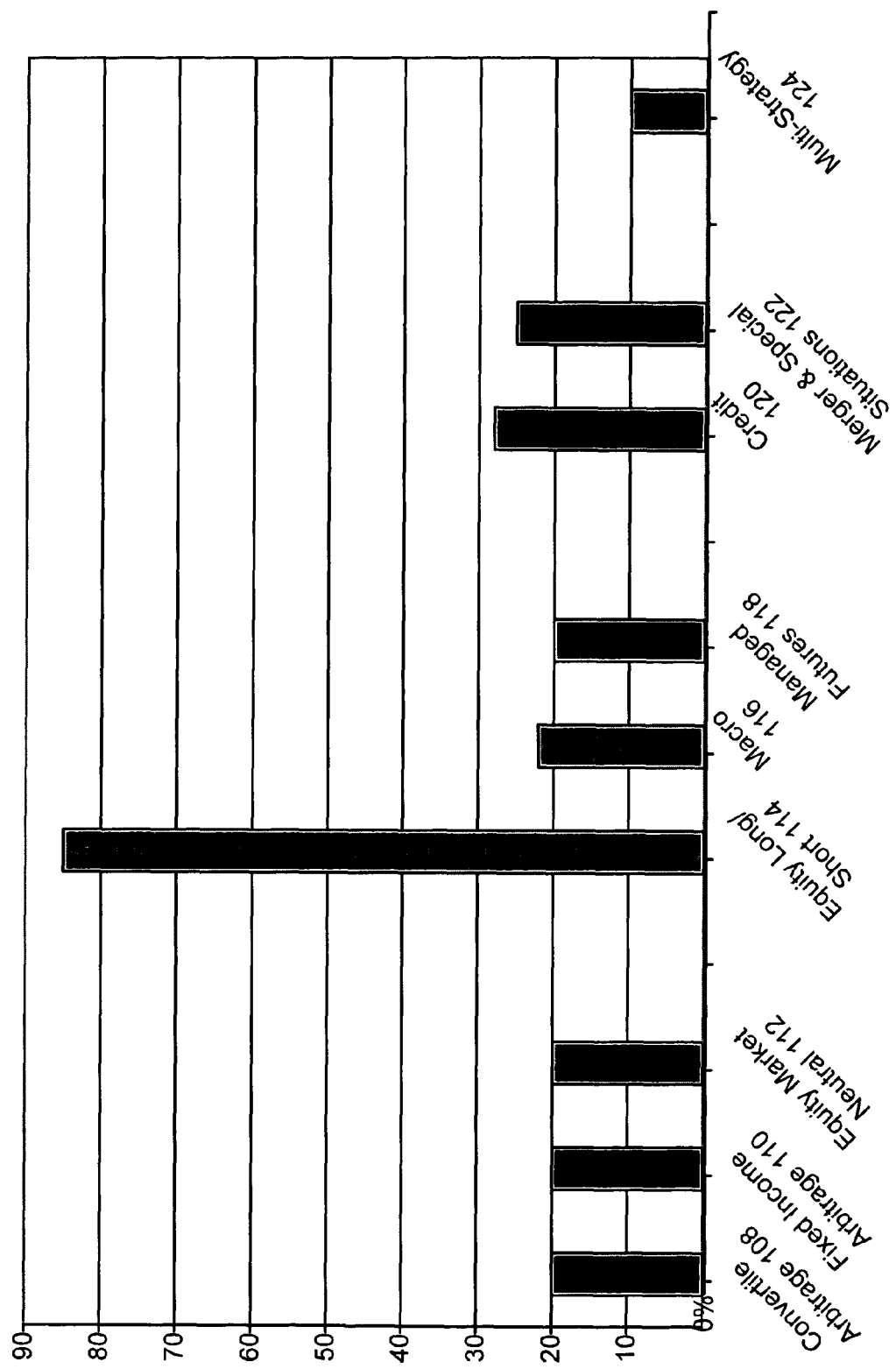
FIG. 8 is a chart of an exemplary number of funds to be included in the hedge fund index for each of the strategies of FIG. 4.

Referring to FIG. 8, an exemplary number of funds to be included in the hedge fund index for each of the strategies 108, 110, 112, 114, 116, 118, 120, 122, and 124 is shown. The allocation shown in FIG. 8 is based on an overall target fund number of 250 and the weights shown in FIG. 7.

Figure 9:
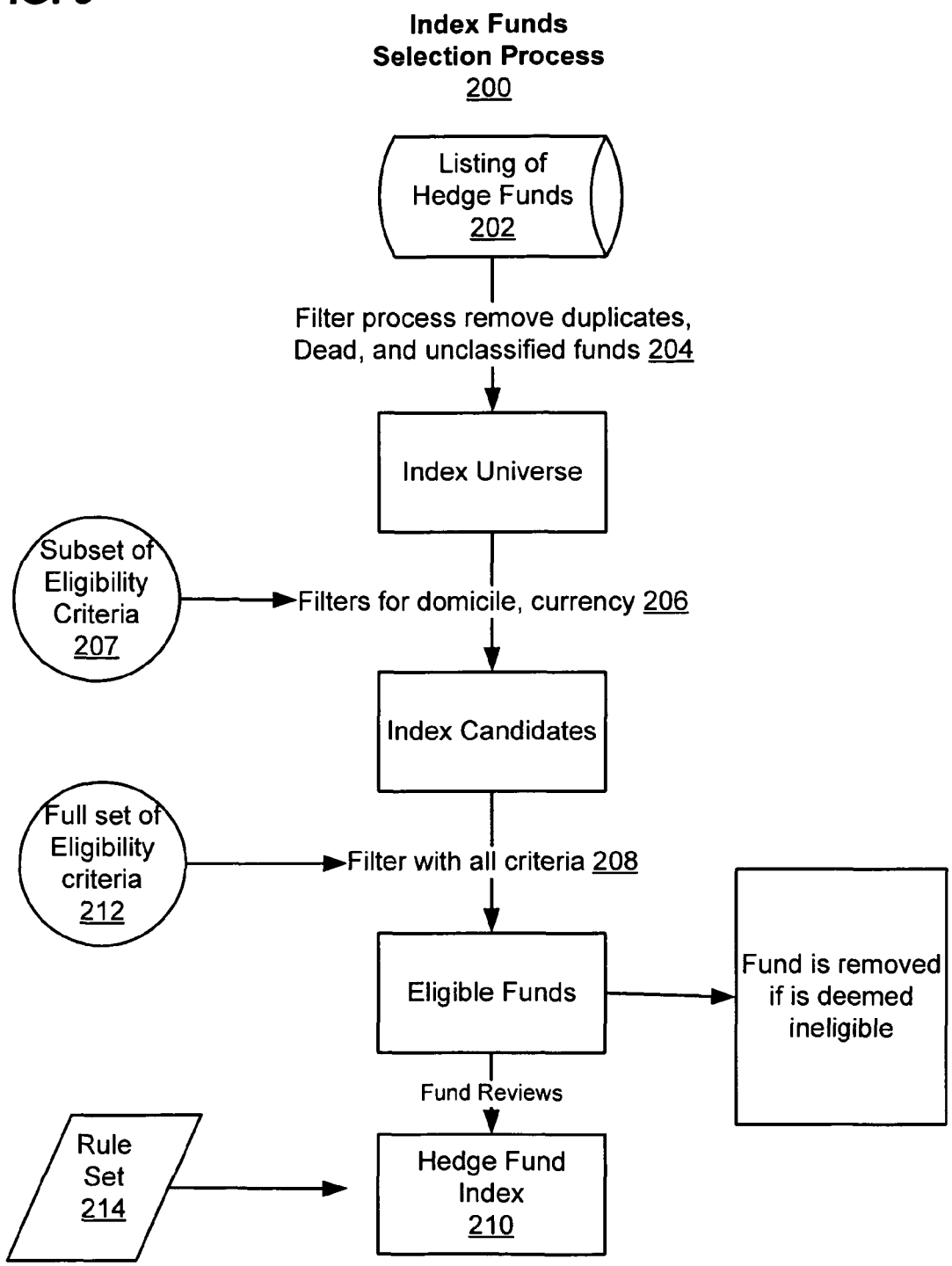
FIG. 9 is a flow chart of a hedge fund selection process.

Referring to FIG. 9, a hedge fund selection process 200 for selecting the hedge funds to include in the hedge fund index for each of the strategies 108, 110, 112, 114, 116, 118, 120, 122 and 124 is shown. The selection process 200 begins with a listing of hedge funds 202 for which information about the fund is available. The information about the funds can be stored in a proprietary database or can be provided by third party data providers. In some examples, the database can include a large number of funds, e.g., 10,000 to 15,000 hedge funds. The large number of hedge funds 202 is filtered 204 to generate a set of active hedge funds that represents the hedge fund industry. For example, the filtering process 204 excludes, among other things, duplicate listings, funds which have ceased operations, and funds that can not be classified in one of the strategies, such as funds of hedge funds. Filtering 204 removes a substantial portion of the hedge funds 202 and generates a set of active hedge funds that typically includes about 3,500-5,500 hedge funds, called index Universe. Each fund in the Universe is categorized into one of the strategies 108, 110, 112, 114, 116, 118, 120, 122, and 124, allowing to calculate the proportion of asset under management of the index Universe allocated to each particular strategy and use these percentages to determine target fund numbers as described above.

The index Universe is filtered 206 against a subset of eligibility criteria 207, described below. This preliminary filtering produces a more manageable set of funds (referred to as index Candidates) that can be investigated in more details, including verification and clarification of the available information, as well as for collecting additional information that was missing in the original database.

The set of index Candidate funds is then filtered 208 against the full set of eligibility criteria 212. The eligibility criteria 212 includes fund specific criteria used reduce the index Universe into a smaller set of eligible funds that meet the limitations set by the fund administrator for the hedge fund index.

The set of eligible funds is used to construct 210 the hedge fund index according to a rule set 214. The rule set 214 includes rules and guidelines for selecting a subset of the eligible funds for inclusion in the hedge fund index (as described below).

An exemplary set of eligibility criteria 212 for filtering the set of active hedge funds to generate a set of eligible funds is shown in table 1 below:

TABLE 1

| Rule 1 | The fund has an actual performance history for at least the preceding 6 months. |
| Rule 2 | The fund is domiciled outside the United States. |
| Rule 3 | The fund issues a US $ denominated class. |
| Rule 4 | The fund has at least US $25 million in assets under management (with respect to a particular fund as opposed to the management company). |
| Rule 5 | The fund requires a minimum initial investment amount no greater than US $250,000, a minimum subsequent investment amount no greater than US $50,000, and minimum redemption amount no greater than US $50,000 (other amounts are possible and the dollar amount limits can be relaxed at the discretion of the index administrator). |
| Rule 6 | The fund accepts subscriptions no less frequently than monthly as of the last or first business day of a month, subject to exception in the discretion of the index administrator. |
| Rule 7 | The fund does not charge subscription fees. |
| Rule 8 | The fund accepts redemptions no less frequently than annually as of the last or first business day of a month. |
| Rule 9 | The redemptions are not in suspension. |
| Rule 10 | The fund has not informed its investors that it is intending to cease operations. |
| Rule 11 | The fund requires no more than 65 calendar days notice for redemptions. |
| Rule 12 | The fund does not have a lock-up period greater than 1 year. |
| Rule 13 | The fund does not "gate" (i.e., limit) the amount of redemptions that a single investor can make over a particular time period (i.e., funds which have the right to limit redemptions across the entire fund may qualify, funds which have the right to limit the redemptions of a single investor would not qualify). |
| Rule 14 | The fund does not charge redemption fees after 1 year from the date of each investment. |
| Rule 15 | The fund offers investments eligible to restricted persons for purposes of "new issues" as defined in NASD Rule 2790. |
| Rule 16 | None of the fund, its management company or any of their affiliates or associated persons are known to the index administrator to be under investigation or review by a regulatory body or other authority for reasons of wrongdoing, breach of any law, regulation, rule, or any other reason that is likely to be materially adverse to the fund as determined by the index administrator. |
| Rule 17 | The fund can be categorized by the index administrator into one of the strategy. |
| Rule 18 | The index administrator is able to obtain the data necessary on the fund for purposes of maintaining the index. |
| Rule 19 | The fund would accept an investment by the index administrator or its affiliates with respect to the index. |
| Rule 20 | The fund satisfies the index administrator's Fund Review. |

Some or all of the rules described above can be used to filter the set of index Universe funds to provide the set of eligible funds. Additional rules can also be used to filter the set of index Universe funds. That is, other implementations of the filtering process can include additional filtering rules not shown or can include a subset of less than all of the rules shown above.

In general, process 208 includes reviewing information about a particular hedge fund and determining if the fund meets the eligibility criteria defined by the set of rules. If the fund does not meet the eligibility criteria, the fund is removed from the set of eligible funds. In determining whether a fund satisfies the eligibility criteria 212, the index administrator uses available information relevant and/or material to making its determinations. Such information may include, but is not limited to, the organizational documents of the fund and agreements between the fund and the index administrator or its affiliates.

In the event there are multiple funds or multiple classes or series of shares of a fund that are similar in terms of investment management and/or investment strategy, the index administrator may select one fund or a blend of these funds, classes, or series to represent the eligible fund.

If desired, in addition to filtering the funds against eligibility criteria, the funds included in the set of eligible funds can be reviewed by an index administrator. During the fund review, the index administrator confirms the appropriate Strategy categorization of a fund. The index administrator can also exclude funds that do not have an appropriate infrastructure or exhibit other features that indicate a significant potential for an unacceptable level of non-investment related losses. While the funds review allows the index administrator flexibility to exclude certain funds, the fund review is not used to assess whether a particular hedge fund will generate superior returns versus other hedge funds or to exclude poor performing funds from the hedge fund index. The fund review may involve consideration of, among other things, the fund's documentation, investment strategy, audited financial statements, background of index providers (which may include reference and background checks) and operations. In some embodiments, on-site meetings may be conducted as part of the fund review. The index administrator may conduct follow-up fund reviews to ensure, among other things, that the fund's strategy classification in a particular strategy remains accurate.

Selecting Index Funds

Figure 10:
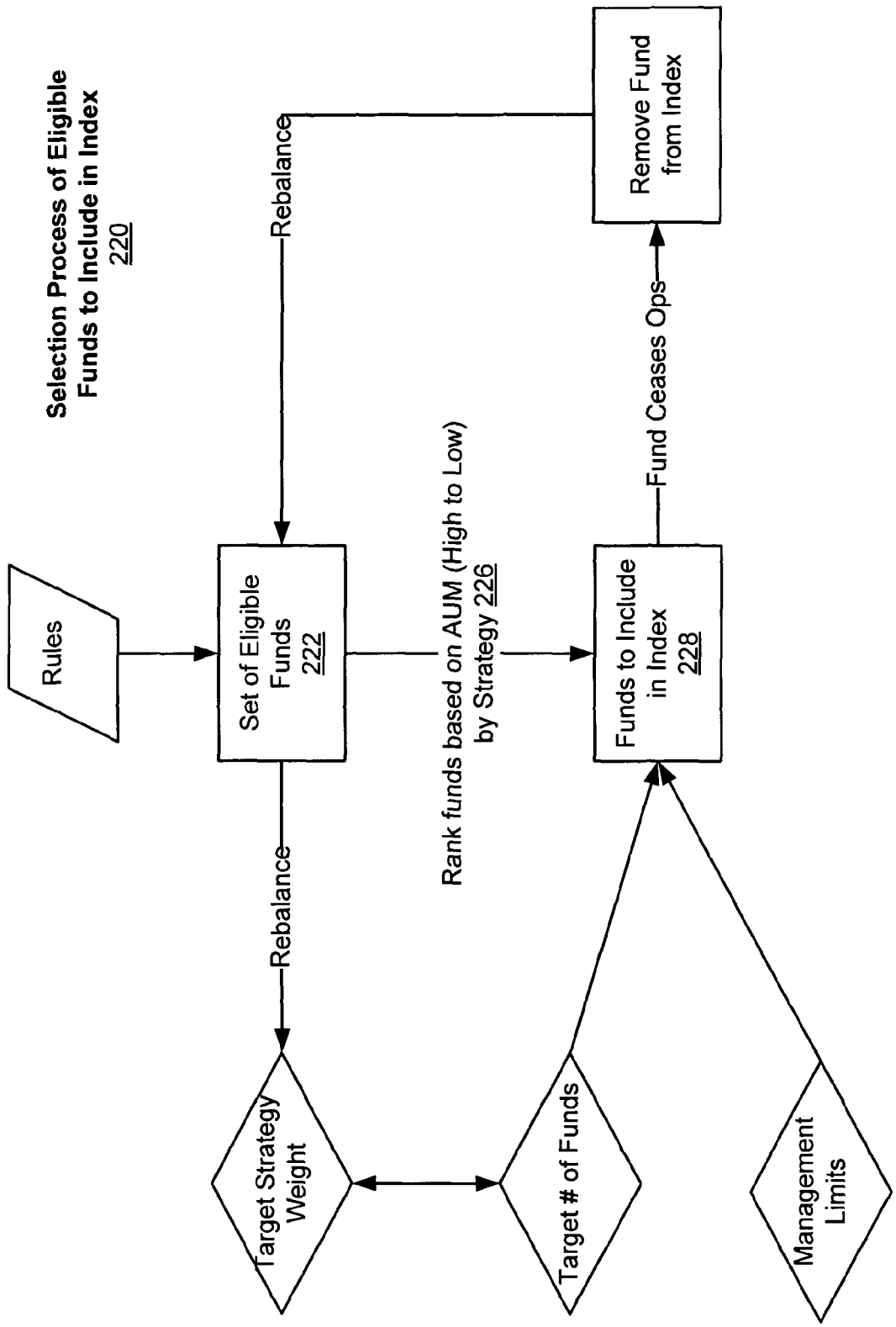
FIG. 10 is a flow chart depicting another aspect of the hedge fund selection process.

Referring to FIG. 10, a process 220 for selecting a subset of the eligible hedge funds to include in the hedge fund index is shown. The set of eligible hedge funds is determined 222 using a rules based process as described above. The eligible funds in each strategy are ranked 226 based on the total assets under management for the hedge fund (e.g., ranked from highest to lowest). The hedge funds included the hedge fund index are selected 228 based on assets under management (AUM) rankings. For example, the funds with the highest value of assets under management for each strategy can be selected for the index. The number of funds selected for each strategy is dependent on the target fund number for the particular strategy (as described above).

For example, if the target fund number for a given strategy is twenty-five, and the number of eligible funds in the strategy is equal or greater than twenty-five, then the twenty-five eligible hedge funds for the strategy with the highest AUM amount will be selected to represent that strategy.

The list of index funds can change with time due to changes in eligibility of the index funds. For example, a fund may cease operations and, consequently, be removed from the index. If during any rebalancing period the number of funds in the index for a particular strategy is less than the target fund number for this group, the index administrator may add additional eligible funds from the this strategy to the hedge fund index, provided that the actual weight of the strategy is below the target strategy weight and that other conditions related to the reallocation adjustments (described below) are met.

That is, the additional eligible funds can be selected to represent the Strategy, in order of AUM from highest to lowest, until the target number of funds is achieved. If even after the target number of funds is achieved, the target strategy weight still can not be achieved, index administrator may continue to add additional eligible funds from the this strategy to the hedge fund index until either the target strategy weight is achieved or there are no eligible funds left. In the event the total capacity of index funds is insufficient to achieve the target strategy weight and there are no eligible funds left, the shortfall is reallocated on a pro-rata basis across the other strategies, subject to the strategy weight caps. Therefore, the strategy weight for the Strategy having the shortfall will be lower, whereas the strategy weights for the other strategies will be higher.

While the process for selecting funds to include in the index shown in FIG. 10 includes selecting the funds with the highest AUM, other selection processes and additional criteria can be used. For example, the index administrator may limit the number of index funds managed by the same management entity (or its affiliates). For example, the index administrator can set a limit such that no more than five funds in the hedge fund index are managed by the same management entity.

Fund and Strategy Weights

Depending on a particular implementation each fund in the index may be weighted equally to the extent possible or each fund in a strategy may be weighted equal to the extent possible or the weights to each fund in the index and/or in a strategy may be assigned based on other criteria, such as AUM. For example, if each fund in the index is weighted equally to the extent possible and if the hedge fund index includes 100 hedge funds and the capacity limit for all funds exceeds 1% of the index Notional Amount, each hedge fund would be allocated a weight of 1%.

In general, the weighs of the individual hedge funds included in the hedge fund index is limited by a fund redemption thresholds and a fund weight floor (as described below).

The strategy weight for a particular strategy is calculated as the sum of the fund weights of the index funds included in the strategy. The strategy weight for each of the strategies may be limited by a maximum permissible strategy weight referred to as a "strategy weight cap."

While initial weights of index funds of the index funds may be set according to the index rules, the fund weights will change over time, leading to corresponding changes in strategy weights. The value for a particular strategy weight cap is set based on the target strategy weight for the particular strategy. For example, the strategy weight cap can be equal to 120% of the respective target strategy weight. The strategy weight cap can be set to other percentages (e.g., 110%, 115%, 125%, 130) of the strategy weight as desired.

Index Rebalancing

For each rebalancing period, the index administrator determines adjustments to the weights of individual hedge funds in the index. These adjustments correct breaches of the fund redemption thresholds and the strategy weight caps and adjust the index for changes in the index notional amount. Adjustments are generally categorized as increase adjustments and decrease adjustments. Assuming no changes in the index Notional Amount, increase adjustments involve an increase to the weight of a particular hedge fund in the index. Addition of a new fund to the hedge fund index is often viewed as a special case of an increase adjustment. Decrease adjustments involve a decrease to the weight of a particular hedge fund in the hedge fund index. A complete removal of an index fund from the index is often considered a specific case of a decrease adjustment.

Adjustments made to the hedge fund index may be determined on a regular, predetermined basis, e.g., during the last week of each month. These dates are referred to as calculation dates of the adjustments. A part of determination of an adjustment is determination of the day when the adjustment starts to affect the performance of the index, e.g., on the first business day of some future period. These dates are referred to as effective dates of the adjustments.

In some embodiments adjustments are calculated on a regular basis, e.g., 5 days prior to the end of each month or quarter. In other embodiments adjustments are calculated only when certain conditions are met. Examples of such condition include ceasing of operations by one or more index funds, breach of a fund redemption threshold, etc. In any case, determination of sizes and effective dates of adjustments is forward looking in nature. In some embodiments, retroactive changes to the adjustment may be either completely prohibited by the index rules, or at least limited to specific and unusual circumstances. In other words, an adjustment determination date typically precedes the adjustment effective date.

On each adjustment determination date sizes of adjustments and the corresponding effective dates are determined for one or more future periods. The number of the future periods (adjustment horizon) is typically determined by the liquidity provisions of the index funds. For example, in some embodiments, increase adjustments are determined only for the next occurring month, because an investment in hedge fund typically requires only several days and can be executed in the hedge by the beginning of the next occurring month.

On the other hand, a decrease adjustment for a fund that requires 90 days notice must be planned at least 3 months ahead, i.e., it requires the adjustment horizon to be at least 3 months. In general, depending on the liquidity provisions of the index fund, the adjustment horizon for decrease adjustments can be for up to several years in the future.

Adjustment Determination Process

Figure 11:
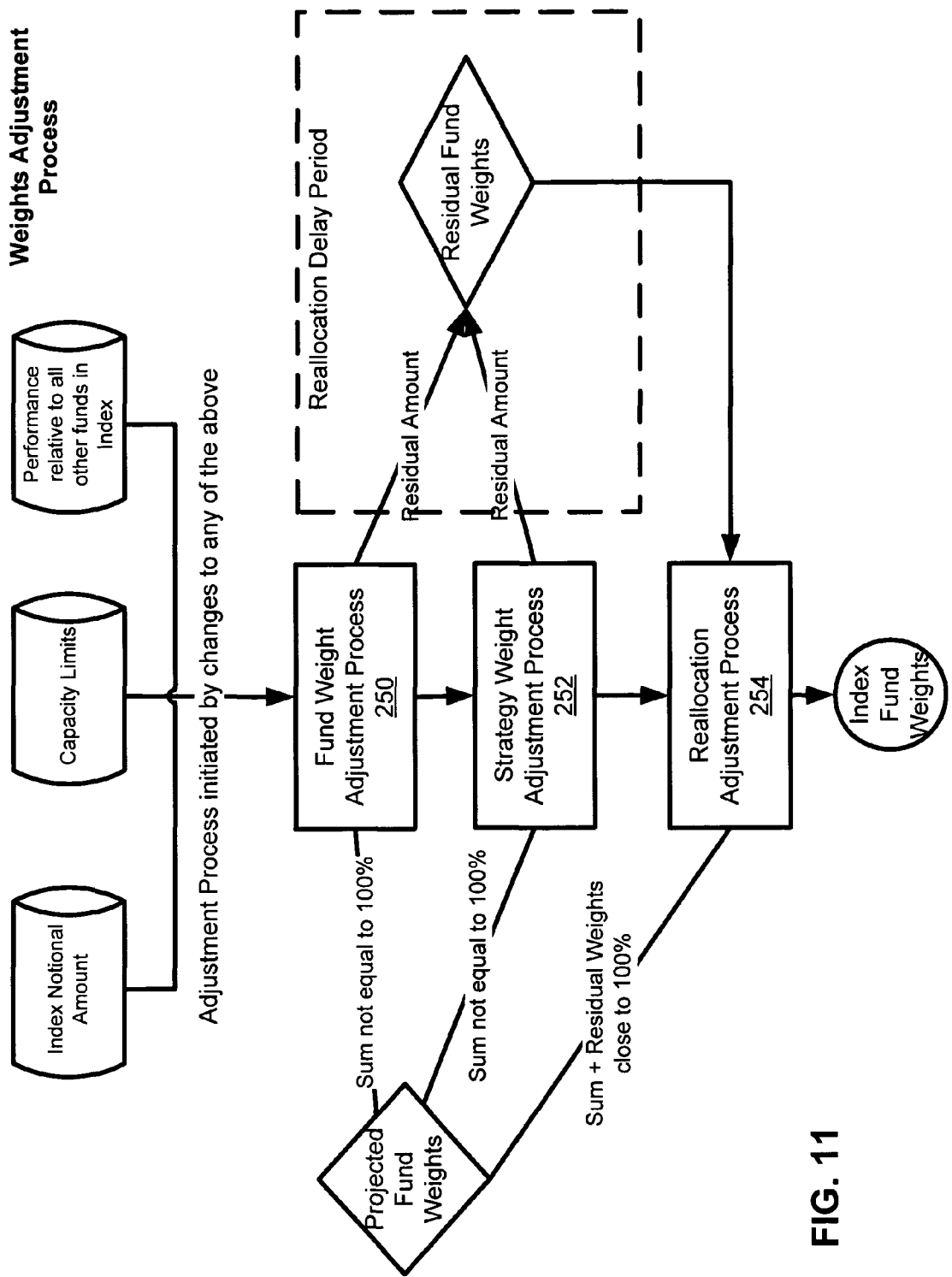
FIG. 11 is a flow chart of adjustment processes.

Referring to FIG. 11, while adjustments can be generally categorized as increase adjustments or decrease adjustments, three adjustment processes 250, 252, and 254 are used to adjust the weights of the funds in the hedge fund index. The adjustment processes include a fund weight adjustment process 250, a strategy weight adjustment process 252, and a reallocation adjustment process 254. The index administrator determines new or revised weights for the funds in the hedge fund index based on adjustment processes 250, 252, and 254, which are performed in succession.

The adjustment processes 250, 252, and 254 are used to adjust the fund weights based on changes to the index notional amount, changes to the Capacity Limits, and changes in performance of the fund relative to all other funds in the index In general, the fund weight adjustment process is used to adjust the weights of funds so that all fund weights are within the desired range. The strategy weight adjustment process 252 is used to adjust the weights of strategies so that all strategy weights are within a desired range.

The determination of specific values for fund and strategy weight adjustments is based on projected fund weights (e.g., the estimated weight of the fund after taking into account changes in index notional amount, outstanding adjustments and residual weights defined below).

In some implementations, all fund and strategy weight adjustments are decrease adjustments and the amount redeemed from an index fund becomes immediately available for reallocation to other index funds. In other implementations the amount redeemed from an index fund becomes available for reallocation only after a pre-determined delay period. During such delay period the redeemed amount is called the residual amount and corresponding weight is called the residual weight. The index rules typically specify the return earned by the residual weights, for example, residual weights may earn zero returns.

In general, in the result of the fund and strategy weight adjustments the sum of projected fund weights will not equal to 100%. The reallocation adjustment process 254 is used to reallocate weights in such a way such that a sum of the projected weights and residual weights for the funds in the hedge fund index is as close as possible to 100%.

Figure 12:
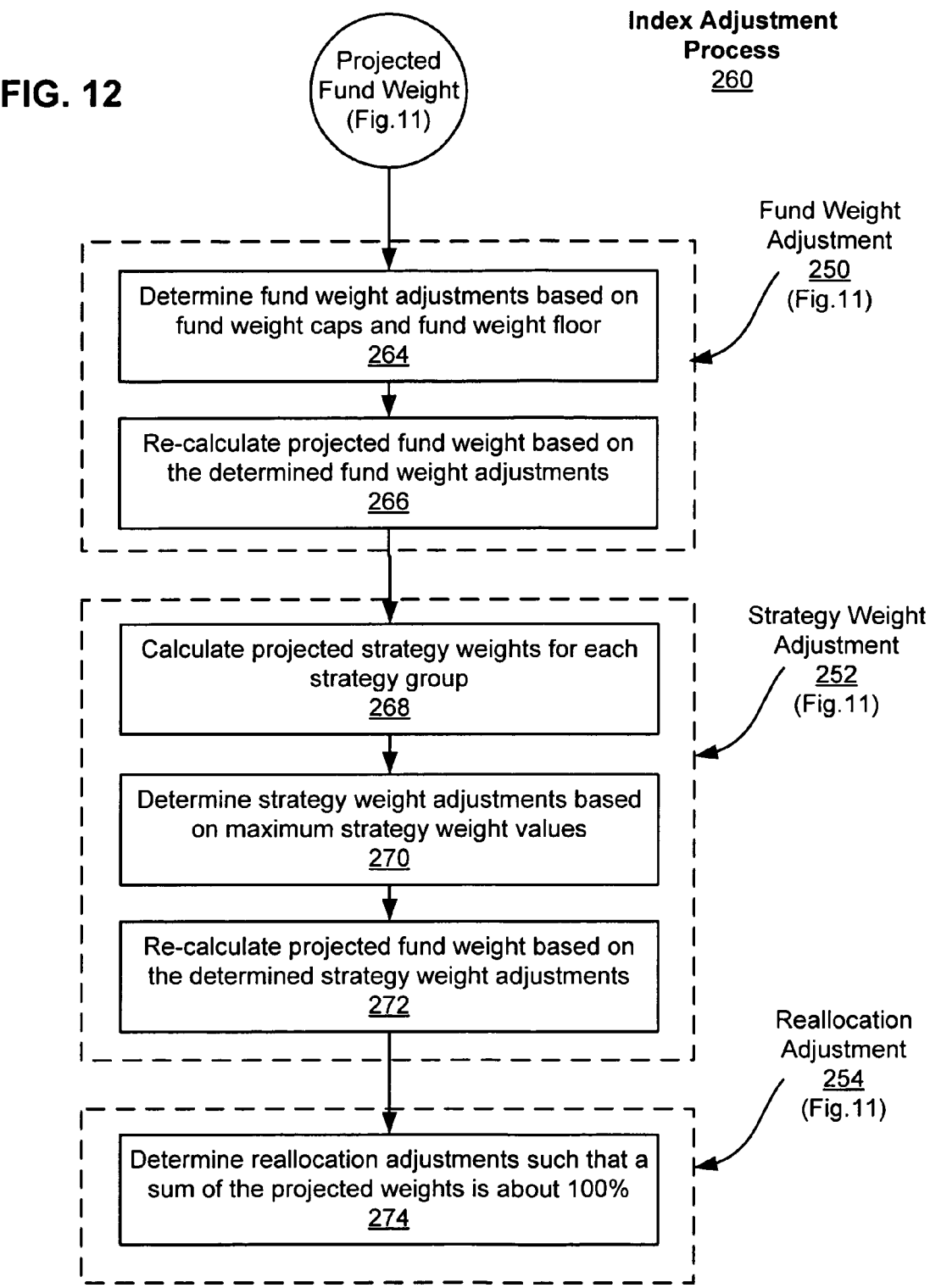
FIG. 12 is a flow chart of an adjustment process.
Figure 13A:
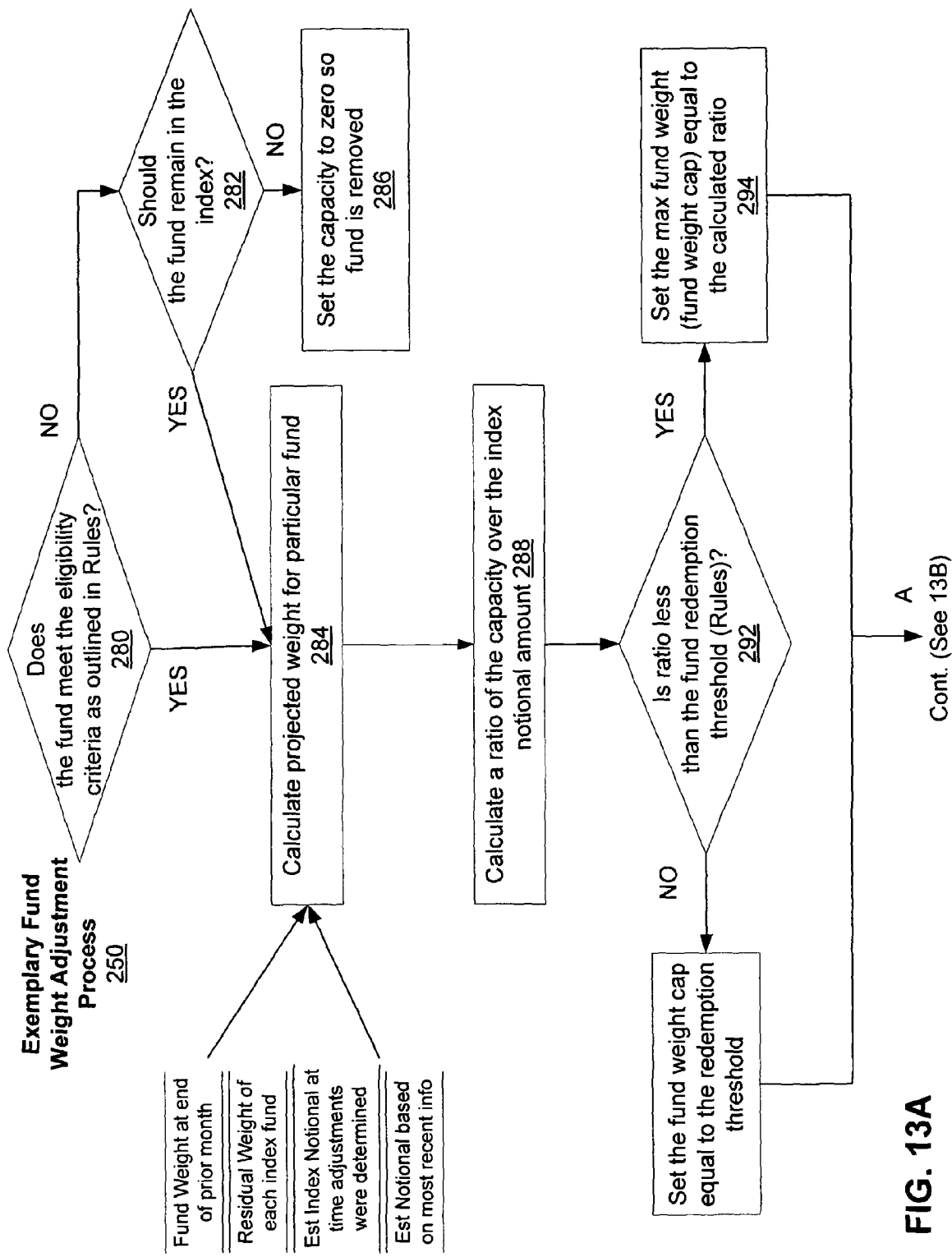
FIGS. 13A and 13B are a flow chart of a fund weight adjustment process.
Figure 13B:
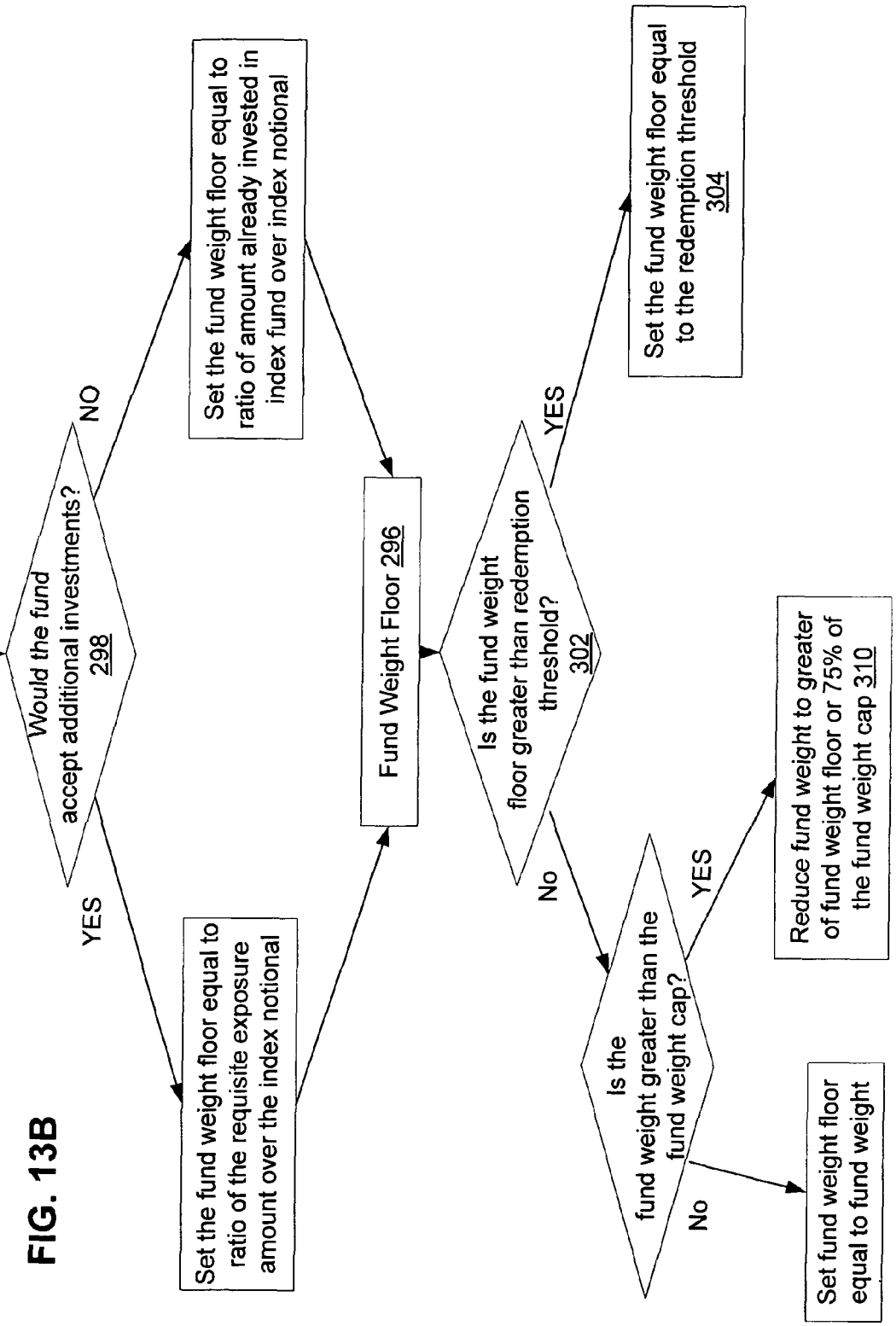

Referring to FIG. 12, an index adjustment process 260 that includes a fund weight adjustment process 250, a strategy weight adjustment process 252, and a reallocation adjustment process 254 is shown. Adjustment process 260 includes calculating a projected fund weight for each fund in the hedge fund index based on changes in the index notional amount, fund performance, and any outstanding adjustments. The projected fund weight estimates the weight of each hedge fund included in the hedge fund index for a particular month. Calculation of the projected fund weight is described in detail below. Based on the projected fund weights, fund weight adjustments are determined 264 based on the maximum fund weight values (e.g., fund redemption thresholds or weight caps) and the minimum fund weight values (e.g., fund weight floors) for each hedge fund in the hedge fund index (e.g., as shown in FIGS. 13A and 13B). Subsequent to calculating the fund weight adjustments, the projected fund weights are re-calculated 266 for each fund in the hedge fund index taking into account the fund weight adjustments from fund weight adjustment process 250. Based on the re-calculated projected fund weights, projected strategy weights for each strategy are calculated 268 and strategy weight adjustments are determined 270 based on maximum strategy weight values (e.g., as described below in FIG. 14).

After calculating the strategy weight adjustments, the projected fund weights for each fund are re-calculated 272 taking into account the strategy weight adjustments. Subsequently, reallocation adjustments are determined 274. The re-allocation adjustments are used to adjust weights of various hedge funds in the index, add funds to the index, or delete funds from the hedge fund index such that a sum of the projected fund weights for all of the funds included in the hedge fund index is equal to or at least about 100%.

As described above, the fund weight adjustment process 250 includes determining adjustments to the fund weights of particular funds in the hedge fund index based on fund redemption thresholds (e.g., maximum fund weight values).

FIGS. 13A and 13B show an exemplary fund weight adjustment process 250. Fund weight adjustment process 250 can be completed for the funds in the hedge fund index on a predetermined basis (e.g., monthly, weekly, quarterly). In order to ensure that the funds in the hedge fund index satisfy the rules used to initially select the funds, the information about a particular fund is reviewed to determine 280 if the hedge fund satisfies the eligibility criteria outlined in the rules. If the fund fails to satisfy the eligibility criteria, the fund is examined in more detail to determine 282 if the fund should remain in the hedge fund index for other reasons, such as liquidity limits and redemption fees. If there are not additional reasons to maintain the fund in the index, the capacity of the fund is set 286 to zero, effectively removing the fund from the hedge fund index.

If the fund either satisfies the eligibility criteria or if there are other reasons that the fund should remain in the index, the projected fund weight is calculated 284 for the particular fund. In doing so, various factors are taken into consideration including the fund weight at the end of the prior month, the residual weight of each index fund, the estimated index notional amount used at the time when the adjustments were determined, and an estimate of the index notional amount based on the most recent information available at the time of the calculation.

In one embodiment, the projected weight of each index fund is determined using the following formula:

$$pfw_{m,n}^b = (efw_{m-1,n}^b - \overline{\omega}_{m-1,n}^b)\eta_{m-1,n}^b / \eta_{m,n}^b + \sum_{k=1}^{n} \alpha_{m,k}\eta_{m,k}^b / \eta_{m,n}^b$$

Where n is the current month, where n<m, $pfw_{m,n}^b$ is the Projected Fund Weight of an index Fund at the beginning of Target Month m as determined in current month n, $efw_{m-1,n}^b$ is the estimated Fund Weight of an index Fund at the beginning of month m−1 determined during the current month n by the index Administrator based on the latest available information, $\overline{\omega}_{m-1,n}^b$ is the Residual Weight of an index Fund at the beginning of month m−1 determined during the current month n, $\eta_{m,n}^b$ is the estimated index Notional Amount at the beginning of Target Month m determined during the current month n by the index Administrator based on the latest available information, $\alpha_{m,k}$ is an Adjustment determined during a month k with an Effective Date as of the beginning of Target Month m. Returns for future months are assumed to be zero and on the index Inception Date m=1, n=0 and $pfw_{1,0}^b=0$, $\overline{\omega}_{0,0}^b=0$.

In one implementation, the fund weight is calculated for a particular hedge fund using the following formula:

$$\omega_m^e = \omega_m^b(1+\rho_m)/(1+\kappa_m)$$

where $\omega_m^e$ is the fund weight at the end of month m, $\omega_m^b$ is the fund weight at the beginning of the month m, $\rho_m$ is the net return of the hedge fund for the month m, and $\kappa_m$ is the hedge fund index return for month m as defined below.

In one embodiment, the preliminary weight of each index fund is determined using the following formula:

$$\phi_m^b = (\omega_{m-1}^e - \zeta_{m-1}^e)\eta_{m-1}^e / \eta_{m}^b + \sum_{k=1}^{m-1} (a_{m,k}\eta_{m,k}^b / \eta_{m}^b) + \delta_m^b$$

where $\phi_m^b$ is the preliminary weight of an index fund at the beginning of the target month m, $\zeta_{m-1}^e$ is the amount of the residual weight of the index fund at the end of month m−1 that is to be reallocated at the beginning of month m, $\eta_{m-1}^e$ is the index notional amount at the end of the month m−1, $\eta_m^b$ is the index notional amount at the beginning of month m, $\alpha_{m,k}$ is the amount of an adjustment determined during the month k for the month m, where k<m, $\eta_{k,m}^b$ is the index notional amount estimated during the month k for the beginning of the target month m, and $\delta_m^b$ is the amount of the residual weight of the index fund which becomes outstanding at the beginning of target month m.

In general, after the completion of fund and strategy weight adjustments the sum of the projected weights and residual amounts will usually be greater than or less than 100% due to changes in the index notional amount and residual weights becoming available for reallocation.

Fund Redemption Threshold and Fund Floor

Referring back to FIGS. 13A and 13B, prior to calculating the fund adjustments, index administrator calculates maximum and minimum fund weights for each fund on the effective date of the adjustments.

First, a ratio of the capacity over the index notional amount is calculated 288. The capacity is the dollar amount determined by the index administrator that is equal to the amount that the index administrator or its affiliates can allocate to the index fund on the effective date of the adjustment. The index notional amount refers to the net dollar exposure of the index provider to the hedge fund index. Then the process determines 292 if the calculated ratio of the capacity over the index notional amount is less than the fund redemption threshold specified by the rules. If the ratio is less than the redemption threshold specified by the rules, then the process sets 294 the maximum fund weight equal to the calculated ratio. Otherwise the process sets 294 the maximum fund weight equal to the fund redemption threshold.

Then the process determines 298 if the particular fund accept investments or additional investments from the index administrator. If the fund would accept additional investments from the index administrator, the fund weight floor is set 296 to a ratio of the requisite exposure amount (described below) over the index notional amount. If the index fund would not accept additional investments from the index administrator, the index administrator sets 296 the fund weight floor equal to the ratio of the amount of investment the index administrator already has in the index fund over the index notional amount.

Requisite exposure amount refers to the minimum amount of exposure the index administrator must maintain in the index fund as a result of the redemption policies of the fund or other factors on the effective date of the adjustment. In order to minimize unnecessary charges to the index, the process 251 allows to eliminate redemptions from certain hedge funds that have redemption fees by setting the fund weight floor at the minimum level that does not trigger the redemption fees.

Subsequent to setting both the redemption threshold and the fund weight floor for a particular fund, the index administrator determines 302 if the fund weight floor is greater than the redemption threshold. If the fund weight floor is greater than the fund redemption threshold, then the fund weight floor and fund redemption threshold are both set 304 to the same value. For example, the value of the fund redemption threshold and fund weight floor can be set to be equal to the fund weight in instances where the fund weight floor is a function of the requisite exposure amount as described above. In cases where the fund weight floor is not a function of the requisite exposure amount the fund weight floor can be set equal to the fund redemption threshold.

Fund Weight Adjustments

Upon determination of the projected fund weights, the index administrator performs the fund weight adjustments, e.g., the index administrator determines if the projected fund weight (e.g., as calculated in 284) exceeds the fund redemption threshold. If the projected fund weight exceeds the redemption threshold, the index administrator makes fund weight adjustments 310 such that the resulting projected fund weight will be reduced, for example, to the greater of (i) the fund weight floor and (ii) approximately 75% of the fund redemption threshold.

Strategy Weight Adjustments

Referring back to FIG. 11, subsequent to determining the fund weight adjustments, the index administrator recalculates the projected fund weights to reflect the fund weight adjustments and calculates strategy adjustments for the funds in the index.

Figure 14:
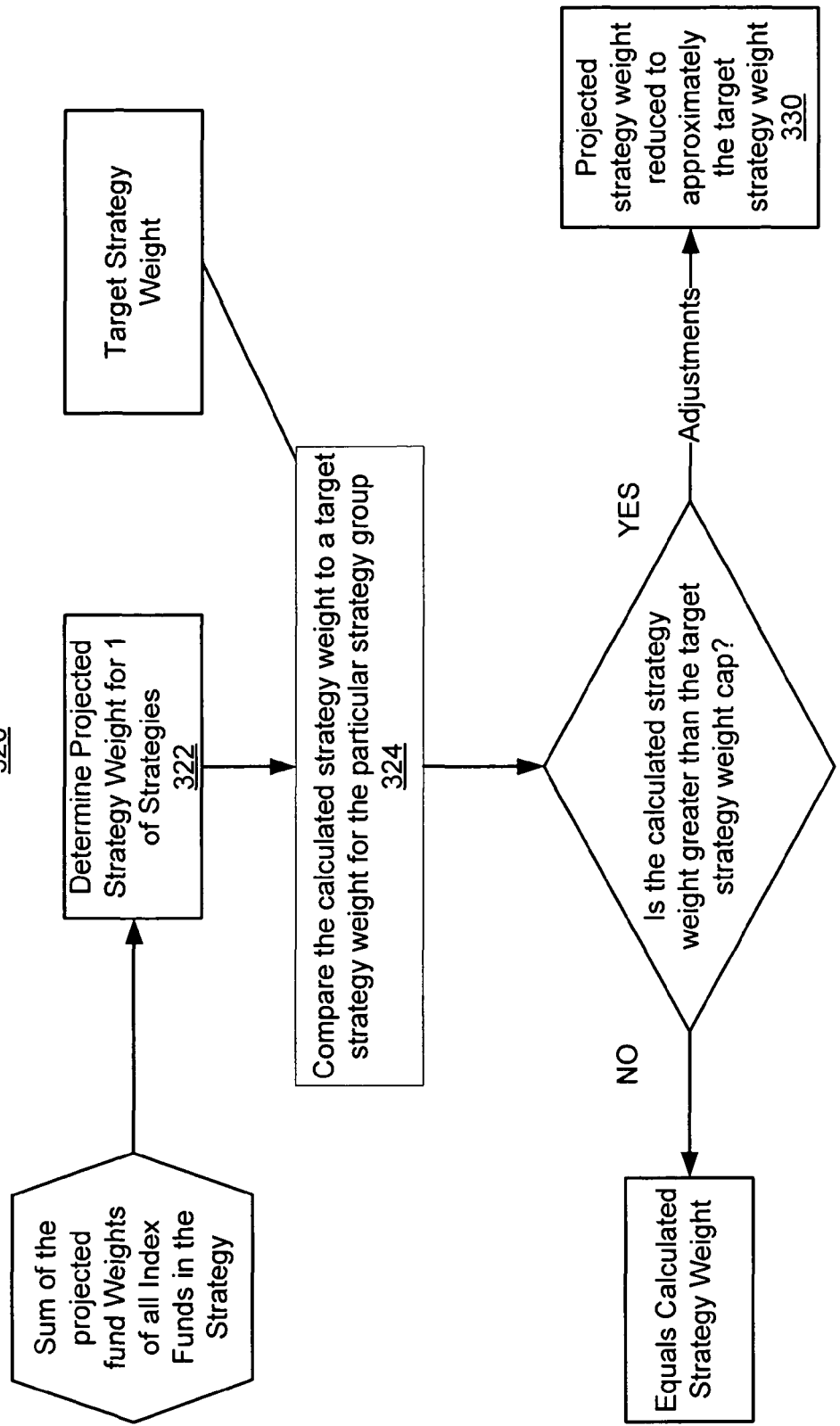
FIG. 14 is a flow chart of a strategy weight adjustment process.

Referring to FIG. 14, an exemplary strategy weight adjustment process 320 is shown. The process 320 determines 322 a projected strategy weight for one of the strategies. The projected strategy weight can be calculated as the sum of the projected fund weights of all index funds in the strategy. Upon determination of the projected strategy weights, the process 320 compares 324 the calculated strategy weight to the target strategy weight for the strategy to determine what, if any, adjustments need to be made to correct instances where a projected strategy weight exceeds a strategy weight cap. If the calculated strategy weight is greater than the target strategy weight cap, then the process 320 adjusts 330 the projected strategy weight such that the projected strategy weight is reduced to approximately the target strategy weight. The adjustment of the projected strategy weight is accomplished by making adjustments to one or more of the index funds in the strategy. The selection of the specific funds to be adjusted and the specific amounts of corresponding fund adjustments can be accomplished using multiple methods. For example, the process 320 adjusts the fund weights of the index funds in the strategy in a manner that results in the highest projected fund weight being as low as possible, subject to the fund weight floors.

Reallocation Adjustments

Figure 15:
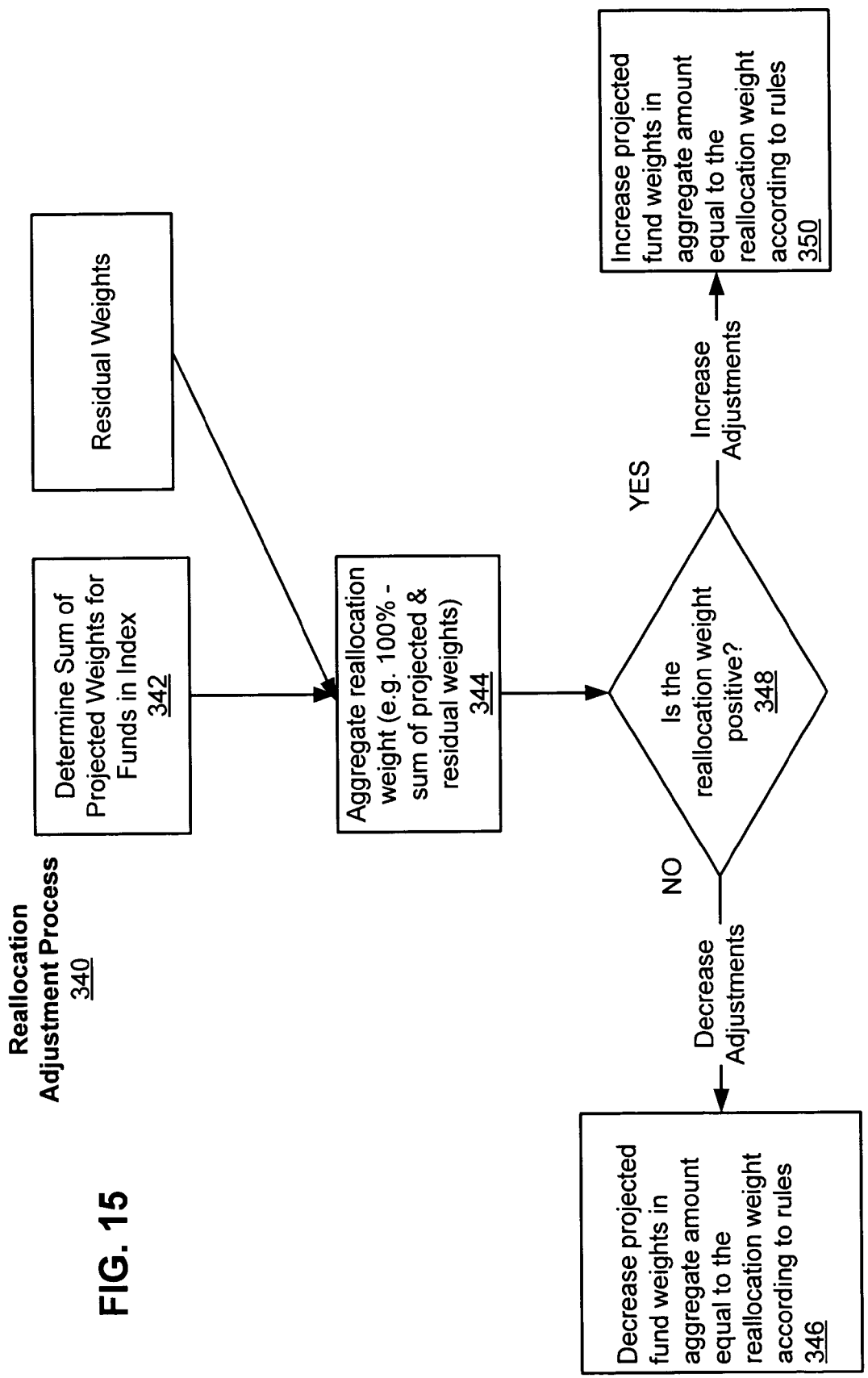
FIG. 15 is a flow chart of a reallocation adjustment process.

Referring back to FIG. 12, subsequent to determining the fund weight adjustments and the strategy weight adjustments, the index administrator recalculates the projected fund weights to include these adjustments and determines the adjustments that need to be made such that the sum of the projected weights and residual weights is maintained at about 100%. Referring to FIG. 15, a reallocation adjustment process 340 for determining the adjustments that need to be made such that the sum of the projected weights is maintained at or near 100% is shown. The reallocation adjustment process 340 recalculates the projected fund weights to include the strategy weight adjustments and determines 342 a sum of the projected weights for the hedge funds included in the hedge fund index. The reallocation adjustment process 340 determines 344 a aggregate reallocation weight based on the sum of the projected weights and residual weights. For example, the reallocation weight can be calculated by taking 100% minus the sum of the projected weights and residual weights. Thus, the aggregate reallocation weight is the aggregate weight to be reallocated for a given effective date. The aggregate reallocation weight for each index fund for a month can be determined using the following formula:

$$arw_m = 1 - \sum_{f=1}^{x} pfw_m^{pf} - \sum_{f=1}^{x} rw_m^{f}$$

where $arw_m$ is the aggregate reallocation weight for month m, x is the number of index funds in the index for the month immediately preceding month m, $pfw_m^{bf}$ is the projected fund weight of index fund f at the beginning of month m, and $rw_m^{f}$ is the residual weight of index fund f for month m Subsequent to calculating the reallocation weight, the reallocation adjustment process 340 determines 348 the sign of the aggregate reallocation. If the aggregate reallocation weight is positive, the reallocation adjustment process 340 makes increase adjustments 350 to increase the projected fund weight of at least some of the index funds in an aggregate amount about equal to the aggregate reallocation weight. The increase reallocation adjustments can be made according to a set of predetermined rules. For example, the aggregate reallocation weight can be reallocated among the strategies in a manner that results in the lowest (negative) value of the difference between the projected strategy weight less the target strategy weight across all strategies being as high as possible. For example, in this case, the aggregate reallocation weight is allocated to the most underweighted strategy or strategies in the index. In the event one or more increase adjustment needs to be made to funds in a strategy and the actual number of index funds representing a strategy is less than the target fund number, the index administrator introduces additional eligible funds to represent the strategy such that the target fund number of funds are included in the hedge fund index for the strategy. When reallocating among index funds within a given strategy, reallocation adjustments can be made in a manner that results in the lowest projected fund weight in the strategy being as high as possible, subject to the fund weight caps, e.g., increase adjustments are made to the most underweighted funds within the strategy.

Regardless of how many index funds represent the strategy in the index, in the event the reallocation adjustments cannot be fully allocated to the index funds previously included in the strategy, the index administrator introduces additional eligible funds to represent the strategy such that the reallocation adjustments can be made to that strategy. If an insufficient number of additional eligible funds exists for a given strategy to fully allocate the reallocation adjustments, the excess reallocation adjustment amount is allocated across the other strategies.

If the index administrator determines 348 that the aggregate reallocation weight is negative, then decrease adjustments are made 346 to decrease the projected fund weight of certain hedge funds in an aggregate amount equal to the aggregate reallocation weight. The decrease reallocation adjustments are made according to a set of predetermined rules. For example, the aggregate reallocation weight can be allocated among strategies in a manner that results in the highest value between the projected strategy weight less the target strategy weight across all Strategies being as low as possible, e.g., decrease adjustments are made to the most overweighted strategy or strategies. Within a given strategy, the index administrator may make reallocation adjustments in a manner resulting in the highest projected fund weight in the strategy being as low as possible, subject to the fund weight floors, e.g., reducing the weight of the most overweighted fund or funds. In some cases, due to the fund weight floors, in order to achieve the desired strategy weight it may be necessary to remove one or more funds from the hedge fund index.

The effective date of each such adjustment, including the complete removal of an index fund from the index, can be set in accordance with the liquidity provisions of the corresponding index fund.

Normalization of Weights

The determination of all index adjustments is based on the estimated weights of the index funds on the effective date of each adjustments. Given that the adjustment effective date is a future date relative to the adjustment determination date, these estimates are typically imprecise and based on the preliminary information available to the index administrator at the determination date. As a result, when index level and index return are calculated based on the actual performance information obtained from the index funds, the sum of the fund weights for all of the index funds will not be equal to 100%. In order to correct this, in the process of index calculations the fund weights may be normalized in such a way that a sum of the fund weights used in calculations is equal to or about equal to 100%. One of the way to achieve this is to multiply all fund weights on a normalization coefficient determined in accordance with the following formula:

$$\gamma_m = 1 \bigg/ \sum_{f=1}^{x} \phi_m^{bf}$$

Where $\gamma_m$ is a normalization coefficient for the period m, x is the number of index funds in the index for the period m, f is an index fund and $\phi_m^{bf}$ is the preliminary weight of the index fund resulting from taking into account actual performance of the fund and all adjustments with effective dates less or equal to the beginning of the period m.

Thus, when the index level and return are calculated for a particular period, the weight of each index Fund at the beginning of each period is equal to the product of the normalization coefficient and the preliminary weight as follows:

$$\omega_m^b = \gamma_m \phi_m^b$$

Index Level

In addition to calculating the hedge fund weights and making adjustments to the weights and calculating index returns, the index administrator determines and publishes an index level. The index level is representative of the value of the index at a particular time. Initially, the index level is set to an initial level, e.g., 100. This level is subsequently adjusted based on the performance of the hedge funds in the hedge fund index. The administrator may report an intra-month estimate of the index level, a preliminary index level, and a final index level. This intra-month estimate of the index level is determined by the index administrator based upon performance estimates received from index funds during the month. A preliminary estimate of the index level for the end of each month will be determined on or about the $15^{th}$ calendar day following a month end. It is not a requirement of index funds to report intra-month and preliminary performance estimates, and therefore, intra-month estimates and preliminary estimates are provided for informational purposes only. This preliminary index level may be revised, based on updated performance data for the index funds, until determination of the final index level. The index administrator determines the official index level for the end of each month on or about the $45^{th}$ calendar day following the end of the month, regardless of whether final information have been actually received. Once a final index level is determined, it is not be revised.

To determine the index level, the index administrator multiplies the index level at the beginning of the month by one plus the month-to-date return of the Hedge fund index. For example, the index administrator calculates the index level according to the following formula:

$$\lambda_m^e = \lambda_m^b (1 + \kappa_m)$$

where $\lambda_m^e$ is the index level at the end of month m, $\lambda_m^b$ is the index level at the beginning of month m, $\kappa_m$ is the index return for month m calculated as the weighted average return of all index funds. The index return is calculated according to the following formula:

$$\kappa_m = \sum_{f=1}^{x} \rho_m^f \omega_m^{bf} - \varphi_m$$

where x is the number of index funds in the hedge fund index during month m, $\rho_m^f$ is the net return of index fund f during month m, $\omega_m^{bf}$ is the fund weight of index fund f at the beginning of month m, and $\phi_m$ is the index administration fee for month m. In some embodiments, the return of the hedge fund index for a given month will be adjusted by the index administrator to deduct an index administration fee. For example, the index administration fee can be about 0.06667% (0.80% per annum) of the index Level at the end of that month for administration of the index.

Net Returns of Index Funds

In calculating the index level, the index administrator determines the net return of each hedge fund $\rho_m^f$ in the index by referencing the most recent return information available that reflects the change in net asset value of the hedge fund. Return information can be provided by the hedge fund, its administrator, or its investment manager, or other sources of data available to the index administrator, including statements relating to actual investments held by itself or its affiliates. If a hedge fund has multiple share classes or series, the index administrator determines which share class or series to reference or may reference a blend of the various classes and series. In the absence of return data, the index administrator may arrive at its own estimate. The index administrator may make modifications to the return data when determining at the net return as described below. The index administrator modifies the return data to better reflect the value of the hedge fund. For example, the index administrator may modify the data if the fund has suspended or is otherwise limiting redemptions. The index administrator may also modify the return data if there is sufficient reason to believe the return data is inaccurate and/or to correct for errors or restatements in valuations from prior months. For reductions in the weight of an index fund, the net return of such fund may include redemption fees as prescribed in the hedge fund's offering documents or elsewhere. The net return will reflect the weighted average redemption charge, if any, which would be payable upon a full or partial redemption from such fund. To the extent such reduction in weight is the result of a reduction in the index notional amount, no redemption charges will be included in the determination of net return. To the extent that a fund weight includes a residual allocation, the net return will be modified on a weighted average basis to reflect the zero return attributed to such residual allocation. In some cases the net return determined by the index administrator may differ substantially from the return data provided by the fund.

Structured Products

Figure 16:
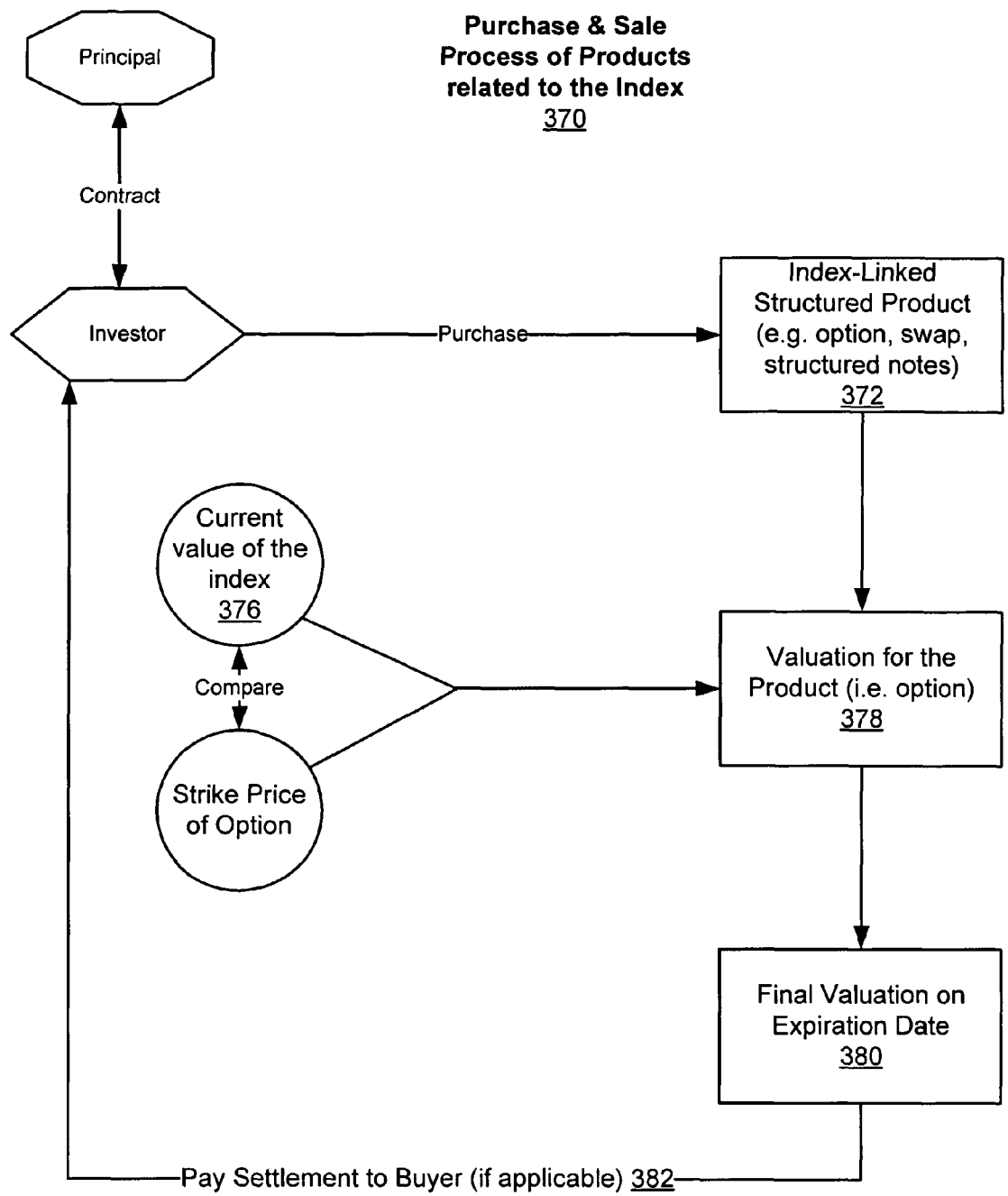
FIG. 16 is a flow chart of a reallocation adjustment process.

Referring to FIG. 16, a process 370 for buying and selling products related to the hedge fund index is shown. Process 370 includes offering for sale options based on the index. In general, the options are tied to the index level and gains/losses are calculated relative to the index level. If an investor desires to invest obtain economic exposure the hedge fund index, the investor purchases 372 an index-linked structured product, e.g., an option, a swap or a structured note from the index provider. When the investor purchases, for example, an options, the investor enters in a contract with a index provider. The contract typically specifies, among other things, a strike price, an expiration date and acceptable levels of leverage. For example, the strike price can be related to the index level on the day the options are purchased. While the investor holds the options, process 370 periodically calculates 378 a valuation for the option based on a comparison of the current index level 376 of the hedge fund index to the strike price of the options. After the index level at the expiration date of the option is finalized, process 370 performs 380 a final valuation of the option. Based on the final value calculation, the index administrator pays 382 a settlement to the buyer (if applicable).

Other embodiments are within the scope of the claims.

What is claimed is:

1. A computer implemented method comprising:
applying one or more sets of eligibility rules to a plurality of hedge funds to provide a set of eligible hedge funds that satisfy the applied sets of eligibility rules;
selecting a subset of the eligible hedge funds that satisfy the applied eligibility rules to include in a hedge fund,
calculating, using a computer system, weights associated with each of the plurality of hedge funds in the hedge fund index according to a set of weighting rules;
storing in a memory the associated weights for each of the plurality of hedge funds;
determining a capacity limit for a particular one of the plurality of hedge funds, the capacity limit being based at least in part on one or more of an amount that the particular hedge fund of the plurality of hedge funds allows to be invested in the particular one of the plurality of hedge funds and an amount that the particular hedge fund of the plurality of hedge funds allows to be redeemed from the particular one of the plurality of hedge funds;
determining a change in monetary exposure of one or more structured products associated with the hedge fund index; and
adjusting, using the computer system, an associated weight in the index for the particular one of the plurality of hedge funds based at least in part on the determined capacity limit for the particular one of the plurality of hedge-funds and the change in monetary exposure.

2. The computer implemented method of claim 1, wherein the capacity limit is a maximum amount that the particular hedge fund of the plurality of hedge funds allows to be invested in the hedge fund; and
adjusting the weight for a particular one of the hedge funds is based on the determined capacity limit.

3. The computer implemented method of claim 1, wherein the capacity limit is a maximum amount that the particular hedge fund of the plurality of hedge funds allows to be redeemed from the hedge fund; and
adjusting the weight for a particular one of the hedge funds is based on the determined capacity limit.

4. The computer implemented method of claim 1, wherein:
determining the capacity limit for the particular one of the plurality of hedge funds is based on a maximum amount that the particular hedge fund of the plurality of hedge funds allows to be invested in the hedge fund.

5. The computer implemented method of claim 4, wherein adjusting the associated weight in the index is further based on a set of predetermined rules.

6. The computer implemented method of claim 5, wherein the set of predetermined rules is based on the maximum amount that the index provider can invest in the hedge fund based on risk management limitations of the index provider.

7. The computer implemented method of claim 5, wherein the set of predetermined rules is based on the maximum amount that the index provider can allocate to the hedge fund based on regulatory limitations, contractual limitations or fiduciary responsibilities.

8. The computer implemented method of claim 1, wherein:
estimating determining the capacity limit for the particular one of the plurality of hedge funds is based on a maximum amount that the particular hedge fund of the plurality of hedge funds allows to be redeemed from the hedge fund.

9. The computer implemented method of claim 8, wherein adjusting the associated weight for the particular one of the plurality of hedge funds further comprises adjusting the weight based on an estimate of the date at which a redemption is allowed.

10. The computer implemented method of claim 8, wherein adjusting the associated weight for the particular one of the plurality of hedge funds further comprises adjusting the weight based on an estimate of the redemption notice period prescribed by the hedge fund.

11. A computer program product, tangibly embodied in a computer readable medium, for executing instructions on a processor, the computer program product being operable to cause a machine to:
apply one or more sets of eligibility rules to a plurality of hedge funds to provide a set of eligible hedge funds that satisfy the applied sets of eligibility rules;
select a subset of the eligible hedge funds that satisfy the applied eligibility rules to include in a hedge fund,
calculate weights associated with each of the plurality of hedge funds in the hedge fund index according to a set of weighting rules;
store in a memory the associated weights for each of the plurality of hedge funds;
determine a capacity limit for a particular one of the plurality of hedge funds, the capacity limit being based at least in part on one or more of an amount that the particular hedge fund of the plurality of hedge funds allows to be invested in the particular one of the plurality of hedge funds and an amount that the particular hedge fund of the plurality of hedge funds allows to be redeemed from the particular one of the plurality of hedge funds;
determine a change in monetary exposure of one or more structured products associated with the hedge fund index; and
adjust an associated weight in the index for the particular one of the plurality of hedge funds based at least in part on the determined capacity limit for the particular one of the plurality of hedge-funds and the change in monetary exposure.

12. The computer program product of claim 11, wherein the capacity limit is a maximum amount that the particular hedge fund of the plurality of hedge funds allows to be invested in the hedge fund; and
the instructions to cause the machine to adjust the weight for a particular one of the hedge funds comprise instructions to cause the machine to adjust the weight based on the determined capacity limit.

13. The computer program product of claim 11, wherein the capacity limit is a maximum amount that the particular hedge fund of the plurality of hedge funds allows to be redeemed from the hedge fund; and
the instructions to cause the machine to adjust the weight for a particular one of the hedge funds comprise instructions to cause the machine to adjust the weight based on the determined capacity limit.

14. A computer-based system comprising:
a processor and a memory configured to:
apply one or more sets of eligibility rules to a plurality of hedge funds to provide a set of eligible hedge funds that satisfy the applied sets of eligibility rules;
select a subset of the eligible hedge funds that satisfy the applied eligibility rules to include in a hedge fund,
calculate weights associated with each of the plurality of hedge funds in the hedge fund index according to a set of weighting rules;
store the associated weights for each of the plurality of hedge funds;

determine a capacity limit for a particular one of the plurality of hedge funds, the capacity limit being based at least in part on one or more of an amount that the particular hedge fund of the plurality of hedge funds allows to be invested in the particular one of the plurality of hedge funds and an amount that the particular hedge fund of the plurality of hedge funds allows to be redeemed from the particular one of the plurality of hedge funds;

determine a change in monetary exposure of one or more structured products associated with the hedge fund index; and adjust an associated weight in the index for the particular one of the plurality of hedge funds based at least in part on the determined capacity limit for the particular one of the plurality of hedge-funds and the change in monetary exposure.

15. The system of claim 14, wherein the capacity limit is a maximum amount that the particular hedge fund of the plurality of hedge funds allows to be invested in the hedge fund; and the system is further configured to adjust the weight based on the determined capacity limit.

16. The system of claim 14, wherein the capacity limit is a maximum amount that the particular hedge fund of the plurality of hedge funds allows to be redeemed from the hedge fund; and the system is further configured to adjust the weight based on the determined capacity limit.

* * * * *